(12) United States Patent
Nakatani et al.

(10) Patent No.: US 10,444,617 B2
(45) Date of Patent: Oct. 15, 2019

(54) IMAGE PROCESSING APPARATUS AND IMAGE PROCESSING METHOD

(71) Applicant: SONY CORPORATION, Tokyo (JP)

(72) Inventors: Ayaka Nakatani, Kanagawa (JP); Yasutaka Hirasawa, Tokyo (JP); Yuhi Kondo, Tokyo (JP); Ying Lu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/565,968

(22) PCT Filed: Mar. 1, 2016

(86) PCT No.: PCT/JP2016/056191
§ 371 (c)(1),
(2) Date: Oct. 12, 2017

(87) PCT Pub. No.: WO2016/174915
PCT Pub. Date: Nov. 3, 2016

(65) Prior Publication Data
US 2018/0107108 A1    Apr. 19, 2018

(30) Foreign Application Priority Data
Apr. 30, 2015 (JP) .................. 2015-093070

(51) Int. Cl.
*G06K 9/00* (2006.01)
*G03B 35/26* (2006.01)
(Continued)

(52) U.S. Cl.
CPC .............. *G03B 35/26* (2013.01); *G01B 11/00* (2013.01); *G01B 11/005* (2013.01);
(Continued)

(58) Field of Classification Search
None
See application file for complete search history.

(56) References Cited

U.S. PATENT DOCUMENTS 9,025,067 B2 * 5/2015 Gray .................... G02F 1/09
  348/335
9,626,767 B2 * 4/2017 Ida .................... G06T 7/586
(Continued)

FOREIGN PATENT DOCUMENTS

AU    2014208262 A1    4/2015
BR    102014018911 A2    12/2015
(Continued)

OTHER PUBLICATIONS

Miyazaki et al. "Polarization-based surface normal estimation of black specular objects from multiple viewpoints", 2012 Second Joint 3DIM/3DPVT Conference: 3D imaging, Modeling, Processing, Visualization & Transmission (Year: 2012).*
(Continued)

*Primary Examiner* — Soo Jin Park
(74) *Attorney, Agent, or Firm* — Chip Law Group

(57) ABSTRACT

A polarized image acquisition section 20 acquires a plurality of polarized images having different polarization directions. The polarized images show, for example, an input indicator for a user interface as a recognition target object. A normal line calculation section 30 calculates normal lines for individual pixels of the recognition target object in accordance with the polarized images acquired by the polarized image acquisition section 20. The normal lines represent information based on the three-dimensional shape of the recognition target object. A recognition section 40 recognizes the object by using the normal lines calculated by the normal line calculation section 30, determines, for example, the type, position, and posture of the input indicator, and outputs the
(Continued)

result of determination as input information on the user interface. The object can be recognized easily and with high accuracy.

17 Claims, 22 Drawing Sheets

(51) Int. Cl.
| | | |
|---|---|---|
| G01B 11/26 | (2006.01) | |
| G01B 11/00 | (2006.01) | |
| G06F 3/01 | (2006.01) | |
| G06T 7/00 | (2017.01) | |
| G01B 11/16 | (2006.01) | |
| G03B 35/04 | (2006.01) | |
| G03B 35/06 | (2006.01) | |
| H04N 5/225 | (2006.01) | |
| G06K 9/20 | (2006.01) | |

(52) U.S. Cl.
CPC ............ *G01B 11/168* (2013.01); *G01B 11/26* (2013.01); *G03B 35/04* (2013.01); *G03B 35/06* (2013.01); *G06F 3/01* (2013.01); *G06K 9/00375* (2013.01); *G06K 9/209* (2013.01); *G06K 9/2036* (2013.01); *G06T 7/00* (2013.01); *H04N 5/2254* (2013.01)

(56) References Cited

U.S. PATENT DOCUMENTS

| | | | | |
|---|---|---|---|---|
| 9,658,463 | B2* | 5/2017 | Imamura | G02B 5/3033 |
| 9,741,163 | B2* | 8/2017 | Fest | G06T 7/004 |
| 2008/0141181 | A1 | 6/2008 | Ishigaki et al. | |
| 2009/0135183 | A1 | 5/2009 | Sato et al. | |
| 2009/0279807 | A1 | 11/2009 | Kanamorl et al. | |
| 2010/0289878 | A1 | 11/2010 | Sato et al. | |
| 2010/0290713 | A1 | 11/2010 | Kanamori et al. | |
| 2012/0206581 | A1 | 8/2012 | Kanamori | |
| 2015/0098013 | A1 | 4/2015 | Gray et al. | |
| 2015/0253428 | A1* | 9/2015 | Holz | G01S 17/42 |
| | | | | 356/5.01 |
| 2016/0261844 | A1* | 9/2016 | Kadambi | G01B 11/24 |
| 2016/0267348 | A1* | 9/2016 | Kondo | G06K 9/2036 |
| 2018/0013988 | A1* | 1/2018 | Kondo | G01B 11/24 |

FOREIGN PATENT DOCUMENTS

| | | | |
|---|---|---|---|
| CA | 2857714 | A1 | 4/2015 |
| CN | 101542232 | A | 9/2009 |
| CN | 101558282 | A | 10/2009 |
| CN | 102047651 | A | 5/2011 |
| CN | 102742258 | A | 10/2012 |
| CN | 104570382 | A | 4/2015 |
| EP | 2071280 | A1 | 6/2009 |
| EP | 2120007 | A1 | 11/2009 |
| EP | 2202688 | A2 | 6/2010 |
| EP | 2860574 | A1 | 4/2015 |
| JP | 10-187978 | A | 7/1998 |
| JP | 2008-146243 | A | 6/2008 |
| JP | 2009-058533 | A | 3/2009 |
| JP | 4317583 | B2 | 8/2009 |
| JP | 4324238 | B2 | 9/2009 |
| JP | 4435867 | B2 | 3/2010 |
| JP | 2011-150689 | A | 8/2011 |
| JP | 4971531 | B2 | 7/2012 |
| JP | 2012-242901 | A | 12/2012 |
| RU | 2009107141 | A | 9/2010 |
| WO | 2008/099589 | A1 | 8/2008 |
| WO | 2009/019886 | A1 | 2/2009 |
| WO | 2009/147814 | A1 | 12/2009 |
| WO | 2012/011246 | A1 | 1/2012 |

OTHER PUBLICATIONS

Atkinson, et al., "Recovery of Surface Orientation From Diffuse Polarization", IEEE Transactions on Image Processing, vol. 15, No. 6, Jun. 2006, pp. 1653-1664.

Wolff, et al., "Constraining Object Features Polarization Reflectance a Using Model", IEEE Transactions on Pattern Analysis and Machine Intelligence, vol. 13, No. 7, Jul. 1991, pp. 635-657.

"Hand Pose Estimate Using Orientation Histograms", 3A1-V03(1), No. 14-2 Proceedings of the 2014 JSME Conference on Robotics and Mechatonics, Toyama, Japan, May 25-29, 2014, 03 pages.

International Search Report and Written Opinion of PCT Application No. PCT/JP2016/056191, dated May 24, 2016, 09 pages of ISRWO.

Murai, et al., "Hand Pose Estimation Using Orientation Histograms", No. 14-2 Proceedings of the 2014 JSME Robotics and Mechtronics, Toyama, Japan, May 25-29, 2014, 03 pages.

Wolff, et al., "Constraining object features using a polarization reflectance model", IEEE Transactions on Pattern Analysis and Machine Intelligence, vol. 13, No. 7, Jul. 1991, pp. 635-657.

Extended European Search Report of EP Patent Application No. 16786192.1, dated Nov. 22, 2018, 08 pages.

* cited by examiner

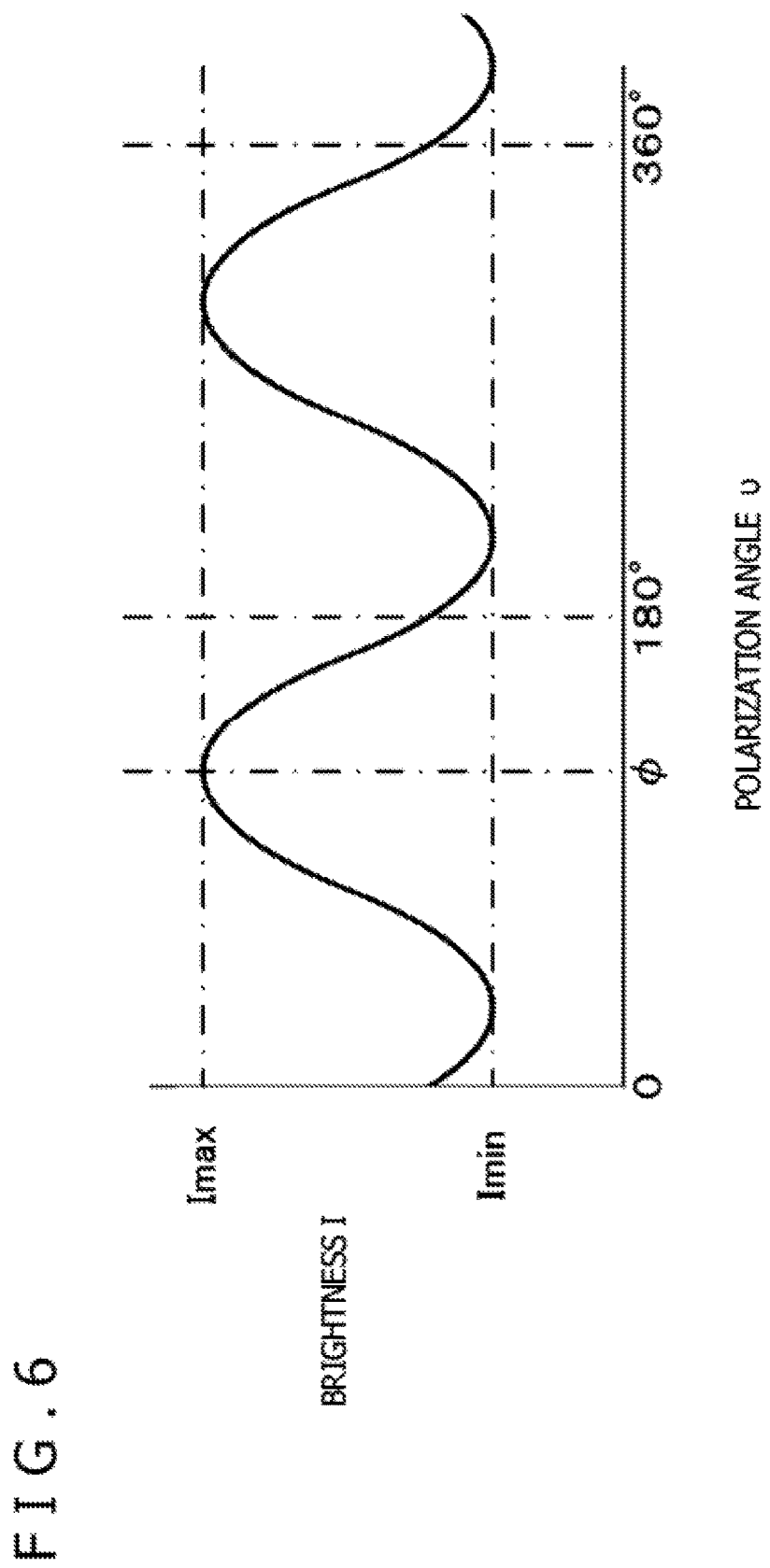
F I G . 6

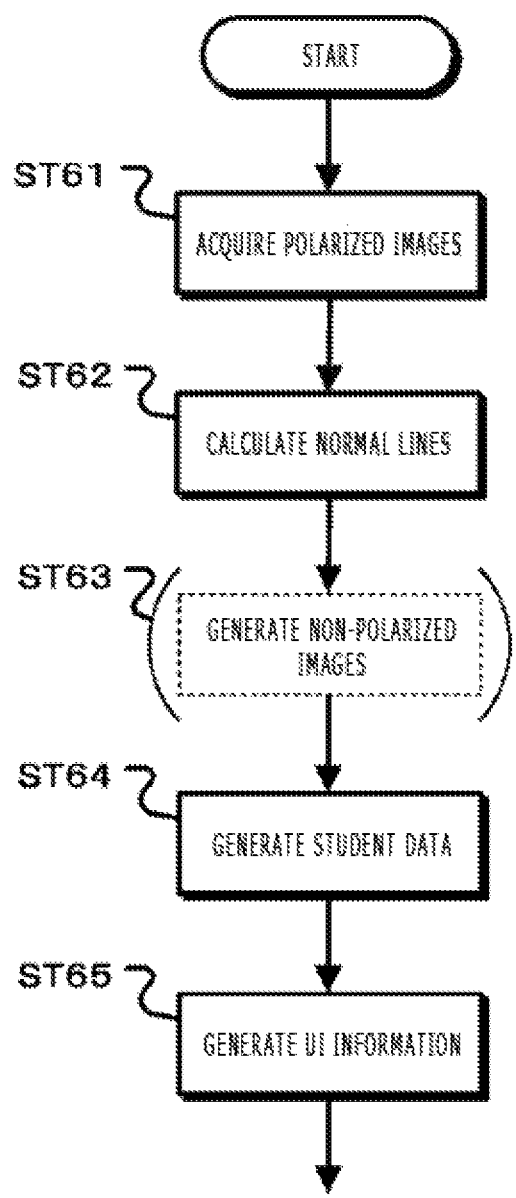

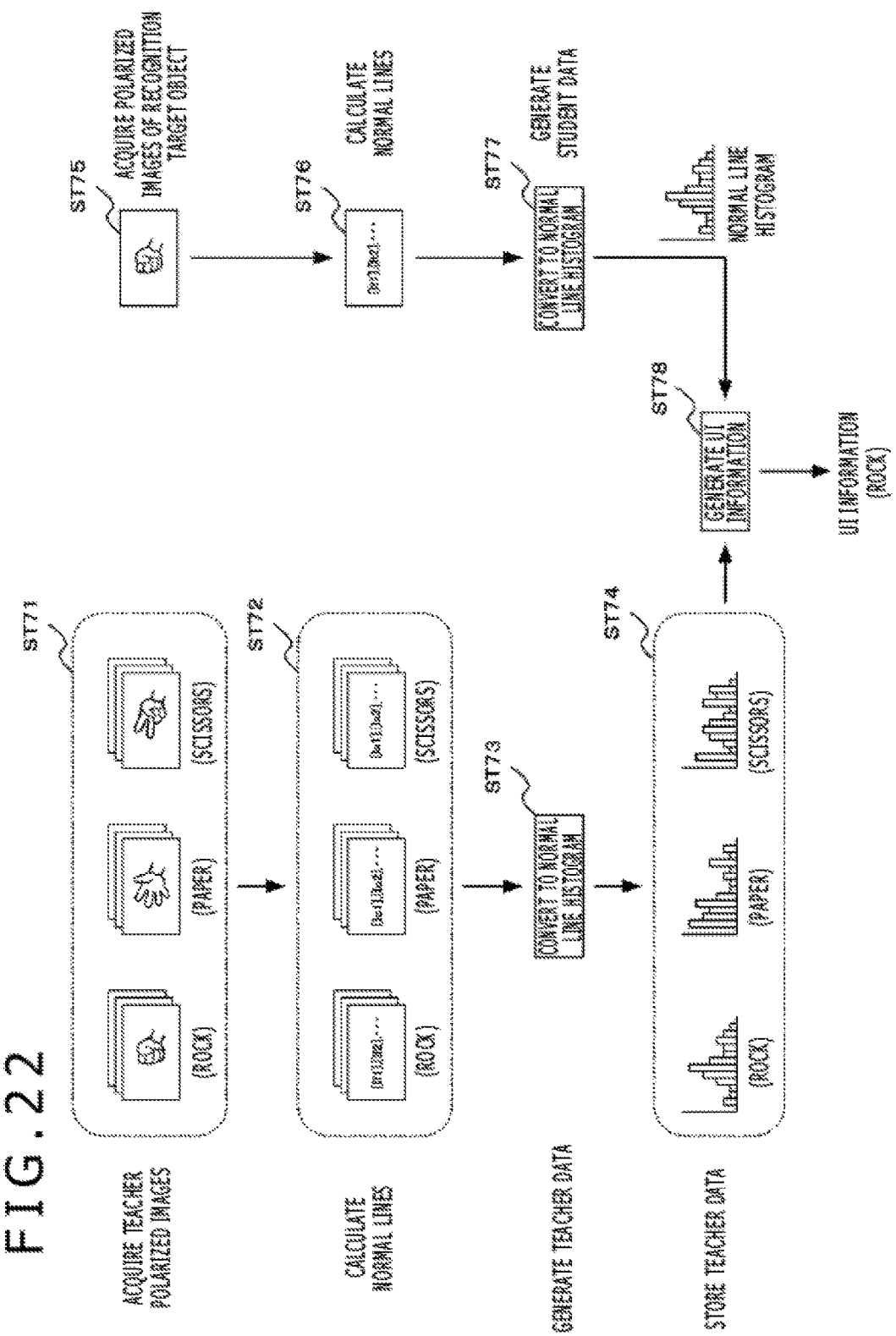

FIG. 23

| CATEGORY | DESCRIPTION | DETAILS |
|---|---|---|
| HAND RECOGNITION | HAND SHAPE RECOGNITION | DETAILED SHAPE OF FINGER CAN BE ACQUIRED BY ACQUIRING SURFACE INFORMATION |
| | FINGER POINTING DIRECTION DETERMINATION | DIRECTION OF FINGER POINTING IS RECOGNIZABLE |
| FACE RECOGNITION | PERSONAL AUTHENTICATION | APPLICABLE TO AUTHENTICATION BASED ON PERSONAL IDENTIFICATION BECAUSE DETAILED SHAPE FORMED BY INCLINED SURFACES CAN BE ACQUIRED FROM ALL PIXELS |
| | FACIAL EXPRESSION RECOGNITION | FACIAL EXPRESSION IS RECOGNIZABLE BECAUSE DETAILED SHAPE OF FACE CAN BE ACQUIRED |
| | SIGHT LINE DIRECTION DETERMINATION | SIGHT LINE CAN BE DETERMINED BECAUSE NORMAL LINES ARE INCLUDED |
| PERSON RECOGNITION | BODY SHAPE AUTHENTICATION | PERSONAL AUTHENTICATION BASED, FOR INSTANCE, ON HEIGHT AND FIGURE |
| | POSTURE DETERMINATION | RECOGNITION OF PERSON'S POSTURE |
| OBJECT RECOGNITION | KNOWN OBJECT POSTURE DETERMINATION | POSTURE OF KNOWN OBJECT IN SCENE IS RECOGNIZABLE |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/056191 filed on Mar. 1, 2016, which claims priority benefit of Japanese Patent Application No. JP 2015-093070 filed in the Japan Patent Office on Apr. 30, 2015. Each of the above-referenced applications is hereby incorporated herein by reference in its entirety.

TECHNICAL FIELD

The present technology relates to an image processing apparatus, an image processing method, and a program, and makes it easy to recognize an object with high accuracy.

BACKGROUND ART

In the past, normal lines of an object have been calculated from polarized images having a plurality of different polarization directions. For example, NPLs 1 and 2 describe a normal line calculation that is performed by applying polarized images having a plurality of different polarization directions to a model equation.

Additionally, for example, an object is recognized by using polarized images. PTL 1, for example, describes object illumination that is performed by disposing illumination means such that the resulting illumination light is p-polarized light with respect to a predetermined reference plane. PTL 1 also describes object identification that is achieved based on light intensity measurement results by separating light reflected from the reference plane into s-polarized light and p-polarized light, measuring the light intensity of each polarization component, and measuring the light intensity while moving a measurement target along the reference plane.

Further, the normal lines are used as a user interface. According to PTL 2, for example, an operation of a target corresponding to a hand and a forearm is detected to recognize a motion similar to a natural motion of the human body that is performed to turn a page. The normal lines of a target plane corresponding to the palm of the hand are used to detect the motion. Meanwhile, the target is detected by extracting the distance distribution and outline of a distance image.

CITATION LIST

Patent Literature

[PTL 1]
JP 2011-150689 A
[PTL 2]
JP 2012-242901 A

Non Patent Literature

[NPL 1]
Lawrence B. Wolff and Terrance E. Boult: "Constraining Object Features Using a Polarization Reflectance Model," IEEE Transaction on pattern analysis and machine intelligence, Vol. 13, No. 7, July 1991

[NPL 2]
Gary A. Atkinson and Edwin R. Hancock: "Recovery of surface orientation from diffuse polarization," IEEE Transactions of Image Processing, Vol. 15, Issue. 6, pp. 1653-1664, 2006

SUMMARY

Technical Problems

Incidentally, when the normal lines are to be calculated by applying polarized images having a plurality of different polarization directions to a model equation, the relationship between the polarization directions and the brightness of the polarized images has a 180-degree periodicity. Therefore, when the azimuth angle of the direction of the normal lines is to be determined, a so-called 180-degree uncertainty remains as a problem. Further, when s-polarized light and p-polarized light are used for identification purposes, the difference between the surface materials of an object can be identified; however, the three-dimensional shape of the object cannot in principle be identified from two polarization directions. Moreover, when target detection or normal line calculation is to be accurately performed based on a distance image, it is necessary to use an image having a high distance resolution. However, it is not easy to acquire an image having a high distance resolution.

In view of the above circumstances, the present technology provides an image processing apparatus, an image processing method, and a program that make it easy to recognize an object with high accuracy.

Solution to Problems

According to a first aspect of the present technology, there is provided an image processing apparatus including a polarized image acquisition section, a normal line calculation section, and a recognition section. The polarized image acquisition section acquires a plurality of polarized images that have different polarization directions and show the image of a recognition target object. The normal line calculation section calculates the normal lines of individual pixels based on the polarized images acquired by the polarized image acquisition section. The recognition section recognizes the object by using the normal lines calculated by the normal line calculation section.

According to the present technology, the polarized image acquisition section acquires a plurality of polarized images that have different polarization directions and show the image, for example, of an input indicator for a user interface as a recognition target object. The normal line calculation section calculates the normal lines of individual pixels based on the acquired polarized images. For example, the normal line calculation section temporarily recognizes the object by using a temporary recognition process image generated from the plurality of polarized images. Further, the normal line calculation section calculates the normal lines from the plurality of polarized images and resolves the uncertainty of the calculated normal lines based on the result of temporary recognition. In temporary recognition, the temporary recognition process image and the images of pre-registered models are used to select a model closest to the object as the result of temporary recognition of the object, and the uncertainty of the normal lines is resolved based on the temporarily recognized model. If the recognition target object is a hand, the normal line calculation section temporarily recognizes the positions of a fingertip and finger pulp by using the temporary recognition process image and the images of pre-registered models, and resolves the uncertainty of the normal lines of a finger region of the hand based on the result of temporary recognition. The recognition section determines a finger pointing direction based on the uncertainty-free normal lines of the finger region. The normal line calculation section may temporarily recognize the position and skeletal structure of a hand region by using the temporary recognition process image and the images of pre-registered models, and resolve the uncertainty of the normal lines of the finger region of the hand based on the result of temporary recognition. In such an instance, the recognition section determines the shape of the hand based on the uncertainty-free normal lines of the hand region. Meanwhile, if the recognition target object is a face, the normal line calculation section temporarily recognizes the position of a face region by using the temporary recognition process image and the images of pre-registered models, and resolves the uncertainty of the normal lines of the face based on the result of temporary recognition. The recognition section determines the shape or expression of the face based on the uncertainty-free normal lines of the face region.

Moreover, the recognition section uses a teacher database section to store teacher data that is based on a learning object, indicative, for example, of the distribution of the normal lines of the learning object, and acquired from the normal lines of the learning object, which is calculated based on a plurality of polarized images that show the learning object and have different polarization directions. The recognition section may use, as student data, the distribution of the normal lines calculated based on the plurality of polarized images that show the recognition target object and have different polarization directions, and select a learning object corresponding to teacher data closest to the student data in accordance with the student data and the teacher data stored in the teacher database section, and regard the selected learning object as the result of recognition of the recognition target object.

According to a second aspect of the present technology, there is provided an image processing method including acquiring, by a polarized image acquisition section, a plurality of polarized images that show a recognition target object and have different polarization directions, calculating, by a normal line calculation section, the normal lines of individual pixels based on the polarized images acquired by the polarized image acquisition section, and recognizing, by a recognition section, the object by using the normal lines calculated by the normal line calculation section.

According to a third aspect of the present technology, there is provided a program for instructing a computer to execute the steps of acquiring a plurality of polarized images that show a recognition target object and have different polarization directions, calculating the normal lines of individual pixels based on the acquired polarized images, and recognizing the object by using the calculated normal lines.

The program according to the present technology can be supplied in a computer-readable format, for example, to a general-purpose computer capable of executing various programs and codes by using a storage medium, a communication medium, a storage medium such as an optical disk, a magnetic disk, or a semiconductor memory, or a communication medium such as a network. When the program is supplied in the computer-readable format, a process according to the program is realized on the computer.

Advantageous Effect of Invention

The present technology acquires a plurality of polarized images that show a recognition target object and have different polarization directions, calculates the normal lines of individual pixels based on the acquired polarized images, and recognizes the object by using the calculated normal lines. Therefore, the recognition target object can be recognized easily and with high accuracy. The advantages described in the present specification are merely illustrative and not restrictive. The present technology is not limited to the described advantages and can provide additional advantages.

BRIEF DESCRIPTION OF DRAWINGS

FIG. 6 is a diagram illustrating the relationship between brightness and polarization angle.

FIG. 21 is a flowchart illustrating a recognition operation performed based on a learning result.

FIG. 22 illustrates an operation of a concrete example according to the second embodiment.

FIG. 23 is a diagram illustrating a user interface to which the present technology is applicable.

DESCRIPTION OF EMBODIMENTS

Embodiments of the present technology will now be described. The description will be given in the following order.

1. Basic Configuration and Basic Operation of Image Processing Apparatus
2. First Embodiment
2-1. Configuration of First Embodiment
2-2. Operation of First Embodiment
2-3. First Concrete Example of First Embodiment
2-4. Second Concrete Example of First Embodiment
2-5. Third Concrete Example of First Embodiment
3. Second Embodiment
3-1. Configuration of Second Embodiment
3-2. Operation of Second Embodiment
3-3. Concrete Example of Second Embodiment

1. Basic Configuration and Basic Operation of Image Processing Apparatus

Figure 1:
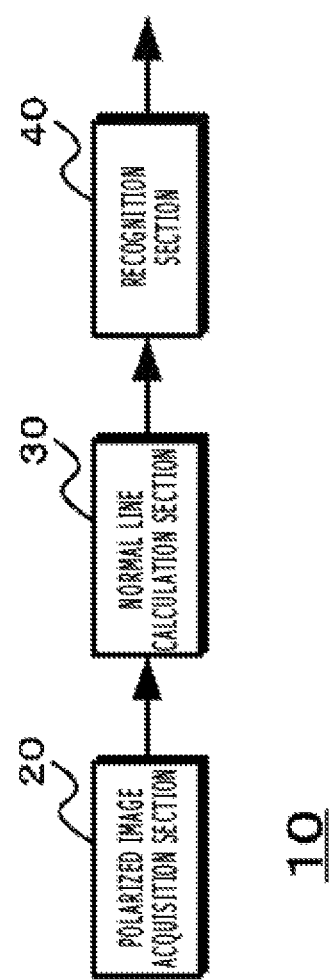
FIG. 1 is a diagram illustrating a basic configuration of an image processing apparatus.

FIG. 1 illustrates a basic configuration of an image processing apparatus. An image processing apparatus 10 includes a polarized image acquisition section 20, a normal line calculation section 30, and a recognition section 40.

The polarized image acquisition section 20 acquires a plurality of polarized images that show a recognition target object and have different polarization directions, such as polarized images having three or more polarization directions. The polarized image acquisition section 20 may include an imaging section for generating polarized images having three or more different polarization directions, or may be configured to acquire polarized images having three or more different polarization directions, for example, from an external instrument or a recording medium.

Based on the polarized images acquired by the polarized image acquisition section 20, the normal line calculation section 30 calculates the normal lines of the recognition target object. The normal line calculation section 30 calculates the normal lines by applying, to a model equation, the plurality of polarized images having different polarization directions, which are acquired by the polarized image acquisition section 20. The normal line calculation section 30 may additionally perform an uncertainty resolution process on the normal lines calculated for individual pixels, for example.

Based on the normal lines calculated by the normal line calculation section 30, the recognition section 40 performs a process of recognizing the recognition target object. If, for instance, the recognition target object is an input indicator for a user interface, the recognition section 40 recognizes, for example, the type, position, and posture of the object and outputs the result of recognition as input information about the user interface.

Figure 2:
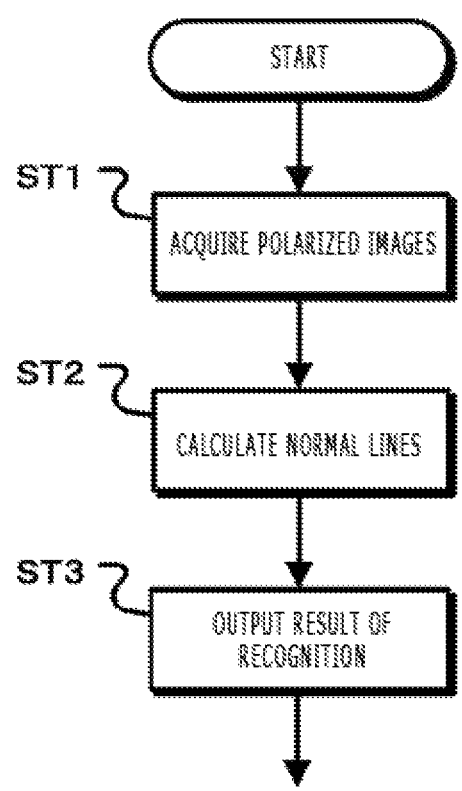
FIG. 2 is a flowchart illustrating a basic operation of the image processing apparatus.

FIG. 2 is a flowchart illustrating a basic operation of the image processing apparatus. In step ST1, the image processing apparatus acquires polarized images. The polarized image acquisition section 20 of the image processing apparatus 10 acquires a plurality of polarized images that show the recognition target object and have different polarization directions. Upon completion of step ST1, processing proceeds to step ST2. In step ST2, the image processing apparatus calculates the normal lines. The normal line calculation section 30 of the image processing apparatus 10 calculates the normal lines of individual pixels based on the polarized images acquired in step ST1. Upon completion of step ST2, processing proceeds to step ST3. In step ST3, the image processing apparatus outputs the result of recognition. Based on the normal lines calculated in step ST2, the recognition section 40 of the image processing apparatus 10 performs a recognition process on the recognition target object, and outputs the result of recognition.

2. First Embodiment

<2-1. Configuration of First Embodiment>

Figure 3:
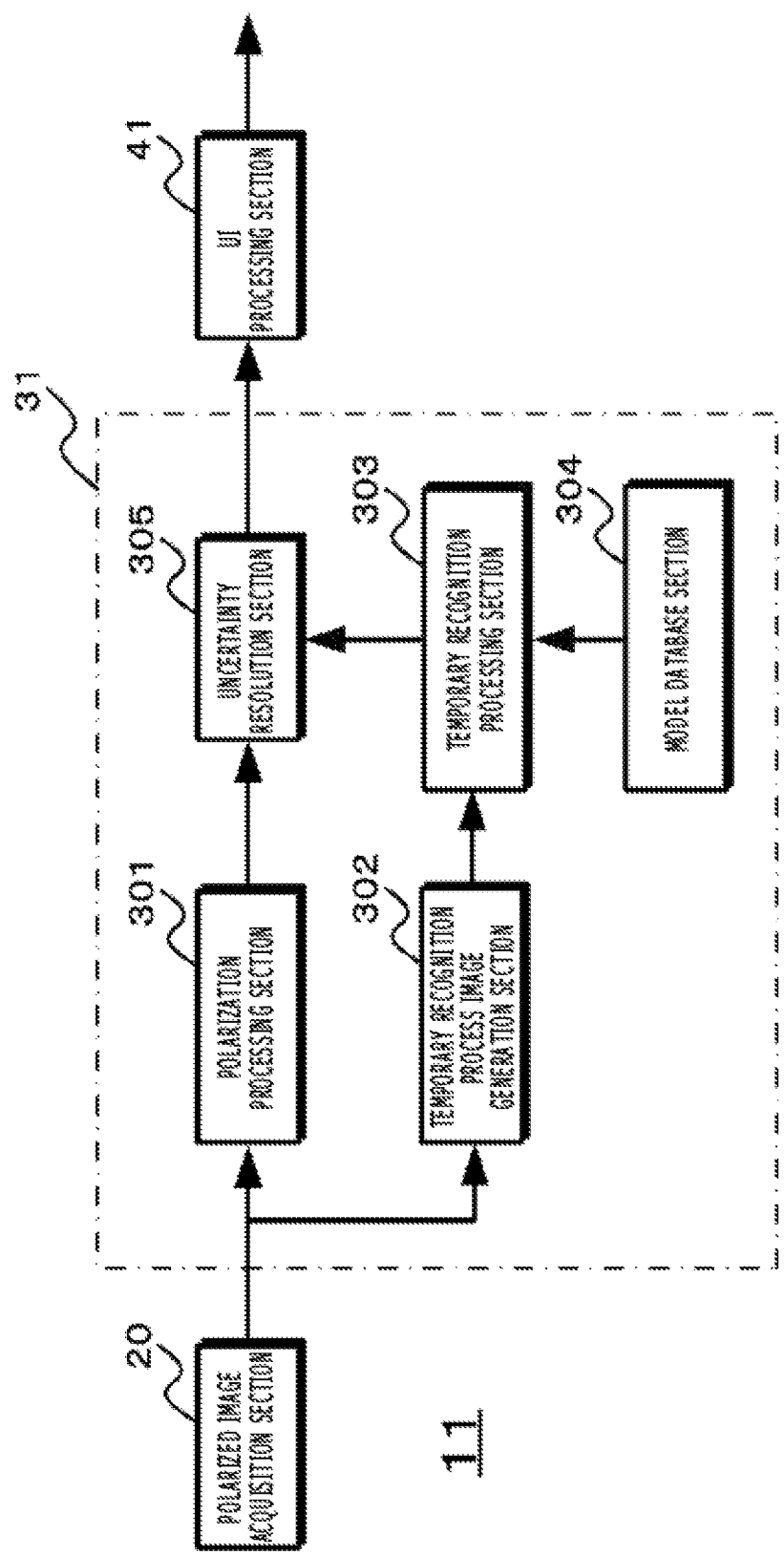
FIG. 3 is a diagram illustrating a configuration of an image processing apparatus according to a first embodiment.

FIG. 3 illustrates a configuration of an image processing apparatus according to a first embodiment. An image processing apparatus 11 includes the polarized image acquisition section 20, a normal line calculation section 31, and a user interface (UI) processing section 41.

Figure 4A:
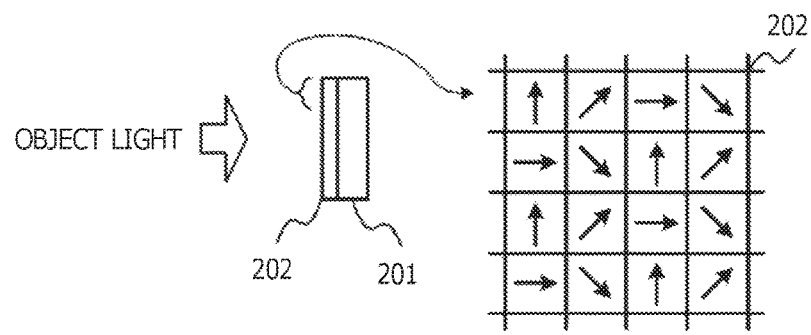
FIGS. 4(a), 4(b), 4(c) and 4(d) depicts diagrams illustrating a configuration in which polarized images are generated in a polarized image acquisition section.
Figure 4B:
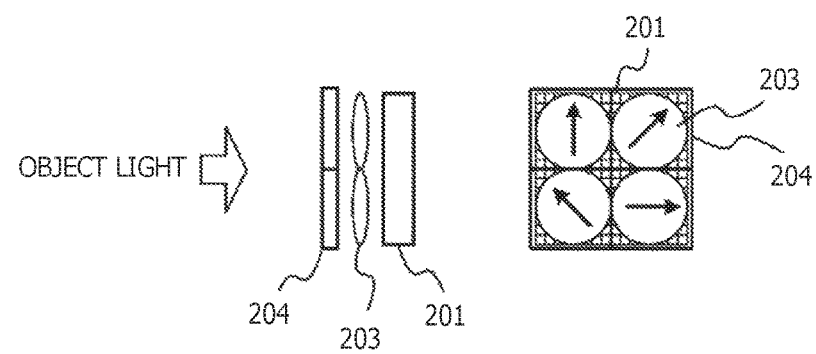
Figure 4C:
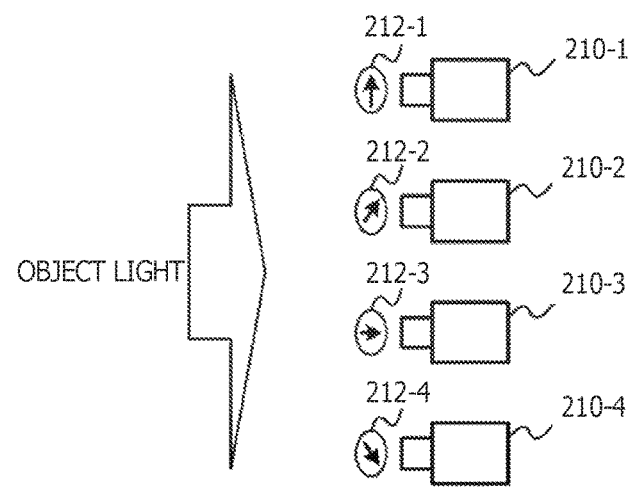

The polarized image acquisition section 20 acquires a plurality of polarized images having different polarization directions. FIGS. 4(a), 4(b), 4(c) and 4(d) illustrates a configuration in which polarized images are generated in the polarized image acquisition section. As illustrated, for example, in FIG. the polarized image acquisition section 20 is configured so that a polarizing filter 202 with pixels oriented in a plurality of different polarization directions is disposed on an image sensor 201, and performs an imaging operation to generate the polarized images. FIG. 4(a) illustrates a case where the polarizing filter 202 having pixels oriented in one of four different polarization directions (the polarization directions are indicated by arrows) is disposed in front of the image sensor 201. Further, the polarized image acquisition section 20 may generate a plurality of polarized images having different polarization directions by using the configuration of a multi-lens array as illustrated in FIG. 4(b). For example, a plurality of lenses 203 (four lenses in the figure) are disposed in front of the image sensor 201, and each lens 203 is used to form an optical image of the object on the imaging plane of the image sensor 201. Further, polarizing plates 204 having different polarization directions are individually disposed in front of the lens 203 to generate a plurality of polarized images having different polarization directions. When the polarized image acquisition section 20 is configured as described above, a plurality of polarized images can be acquired by performing a single imaging operation. Therefore, a recognition process can be promptly performed on the recognition target object. Meanwhile, as illustrated in FIG. 4(c), polarizing plates 212-1 to 212-4 having different polarization directions may be disposed in front of imaging sections 210-1 to 210-4 in order to generate a plurality of polarized images having different polarization directions from a plurality of different viewpoints.

Figure 4D:
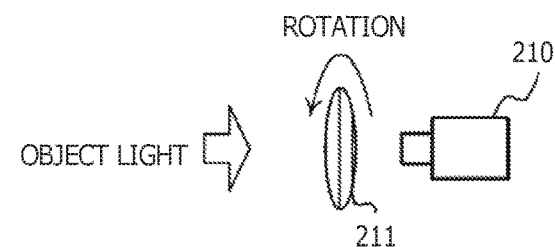

If the recognition target object moves slowly or stepwise, a polarizing plate 211 may be disposed in front of an imaging section 210 as illustrated in FIG. 4(d). In such an instance, the polarizing plate 211 is rotated to perform an imaging operation in each of different polarization directions and acquire a plurality of polarized images having different polarization directions.

If the image sensor 201 uses no color filter, the polarized image acquisition section 20 is able to acquire brightness-polarized images. Here, in the case illustrated in FIG. 4(a), an image equivalent to a non-polarized, normal brightness image can be acquired by averaging the brightness values of four neighboring pixels having different polarization directions. In the cases illustrated in FIGS. 4(b) and 4(c), parallax between a plurality of polarized images having different polarization directions is negligible as far as the spacing intervals between the lenses 203 and the imaging sections 210-1 to 210-4 are negligibly short as compared to the distance to the object. Therefore, an image equivalent to a non-polarized, normal brightness image can be acquired by averaging the brightness values of polarized images having different polarization directions. If the parallax is not negligible, an image equivalent to a non-polarized, normal brightness image can be acquired by repositioning the polarized images having different polarization directions in accordance with the amount of parallax and averaging the brightness values of the repositioned polarized images. In the case illustrated in FIG. 4(d), an image equivalent to a non-polarized, normal brightness image can be acquired by averaging the brightness values of the brightness-polarized images with pixels having different polarization directions.

Further, the polarized image acquisition section 20 may be configured to provide the image sensor 201 with color filters in order to simultaneously generate a brightness-polarized image and, for example, a three-primary color image or an infrared image. Moreover, the polarized image acquisition section 20 may generate a brightness image by calculating the brightness from the three-primary color image.

The normal line calculation section 31 calculates uncertainty-free normal lines from a plurality of polarized images acquired by the polarized image acquisition section 20 and auxiliary information such as various models. The normal line calculation section 31 includes, for example, a polarization processing section 301, a temporary recognition process image generation section 302, a temporary recognition processing section 303, a model database section 304, and an uncertainty resolution section 305.

Figure 5:
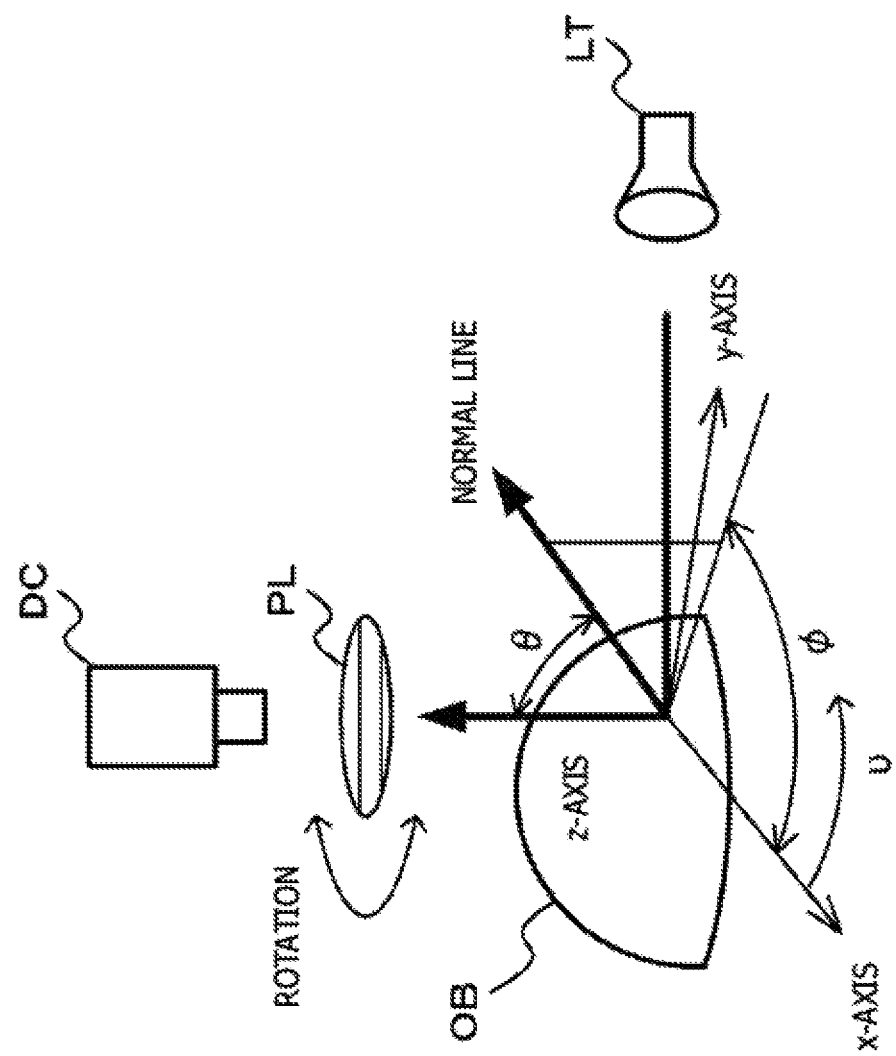
FIG. 5 is a diagram illustrating the polarized images and the shape of an object.

The polarization processing section 301 calculates normal lines from the polarized images and outputs the calculated normal lines to the uncertainty resolution section 305. The shape of an object and the polarized images will now be described with reference to FIG. 5. As illustrated, for example, in FIG. 5, a light source LT is used to illuminate an object OB, and an imaging section DC captures an image of the object OB through a polarizing plate PL. In this instance, the captured image is such that the brightness of the object OB varies with the polarization direction of the polarizing plate PL. For ease of explanation, it is assumed that a highest brightness of Imax and a lowest brightness of Imin are obtained when, for example, the polarizing plate PL is rotated to capture a plurality of polarized images. Further, in a situation where x-axis and y-axis in a two-dimensional coordinate system are on the plane of the polarizing plate PL, the angle in the y-axis direction with respect to the x-axis when the polarizing plate PL is rotated is assumed to be the polarization angle υ.

When the polarizing plate PL is rotated 180 degrees, it reverts to the previous polarization state because it has a 180-degree periodicity. Further, the polarization angle υ obtained when the maximum brightness Imax is observed is assumed to be the azimuth angle ϕ. When such a definition is formulated, the brightness I observed when the polarizing plate PL is rotated can be expressed by Equation (1) below. FIG. 6 illustrates the relationship between brightness and polarization angle. Also, the example in FIG. 6 depicts a diffuse reflection model. In the case of specular reflection, the azimuth angle is 90 degrees away from the polarization angle.

Mathematical 1

$$I = \frac{I_{max} + I_{min}}{2} + \frac{I_{max} - I_{min}}{2} \cos(2\upsilon - 2\phi) \quad (1)$$

In Equation (1), the polarization angle υ is obvious at the time of polarized image generation, and the maximum brightness Imax, the minimum brightness Imin, and the azimuth angle ϕ are variables. Therefore, when the brightness values of polarized images having three or more polarization directions are fitted into a model equation indicated by Equation (1), the azimuth angle ϕ, which is a polarization angle providing the maximum brightness, can be determined based on the model equation indicative of the relationship between brightness and polarization angle.

Further, the normal lines on an object surface are expressed by a polar coordinate system and indicated by the azimuth angle ϕ and zenith angle θ. It is assumed that the zenith angle θ is an angle measured from the z-axis toward the normal lines, and that the azimuth angle ϕ is an angle in the y-axis direction with respect to the x-axis as mentioned earlier. In this instance, when the minimum brightness Imin and the maximum brightness Imax are obtained upon rotation of the polarizing plate PL, the degree of polarization ρ can be calculated based on Equation (2) below.

Mathematical 2

$$\rho = \frac{I_{max} - I_{min}}{I_{max} + I_{min}} \quad (2)$$

Figure 7:
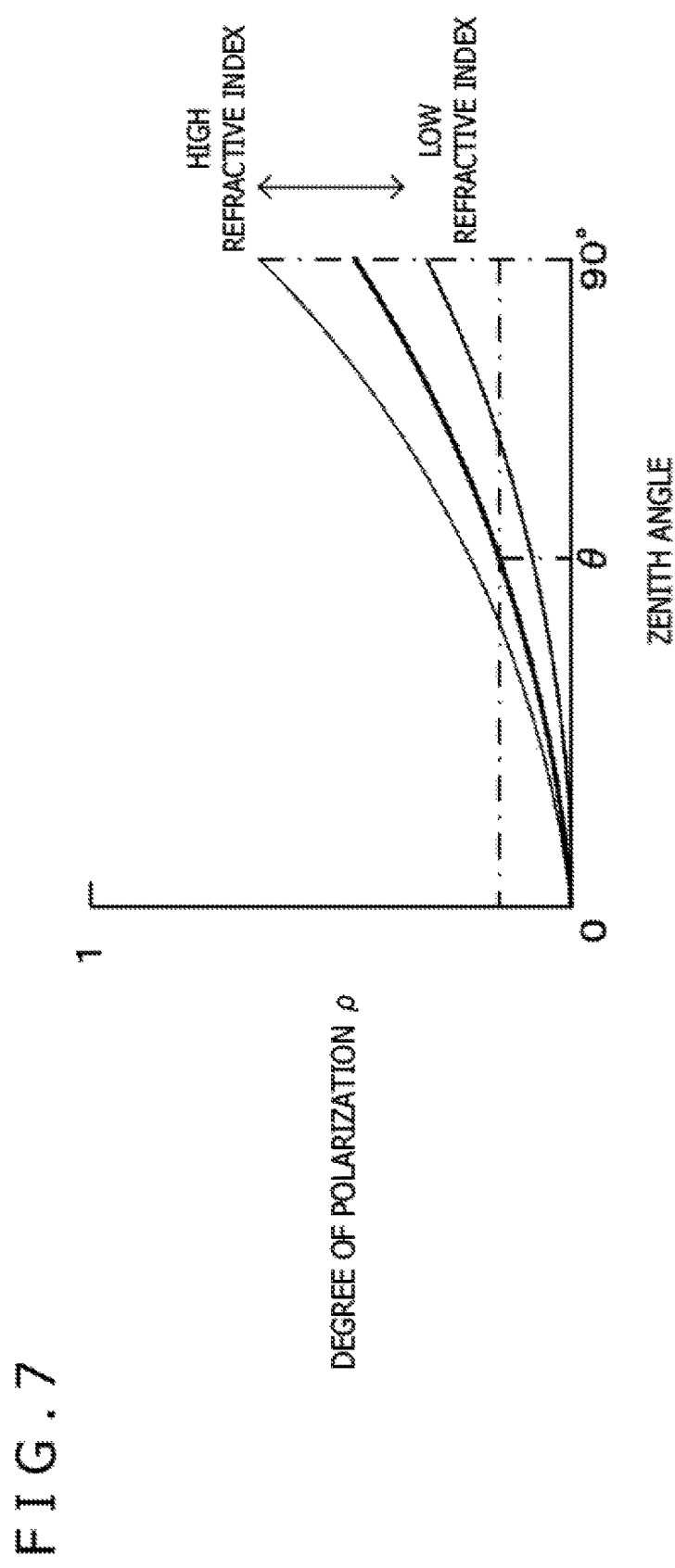
FIG. 7 is a diagram illustrating the relationship between polarization angle and zenith angle.

It is known that, in the case of diffuse reflection, the relationship between the degree of polarization ρ and the zenith angle θ exhibits the characteristics depicted, for example, in FIG. 7 based on the Fresnel equations. Therefore, the characteristics depicted in FIG. 7 indicates that the zenith angle θ can be determined based on the degree of polarization ρ. The characteristics depicted in FIG. 7 are merely illustrative and vary depending, for instance, on the refractive index of the object. For example, the degree of polarization increases with an increase in the refractive index.

Figure 8A:
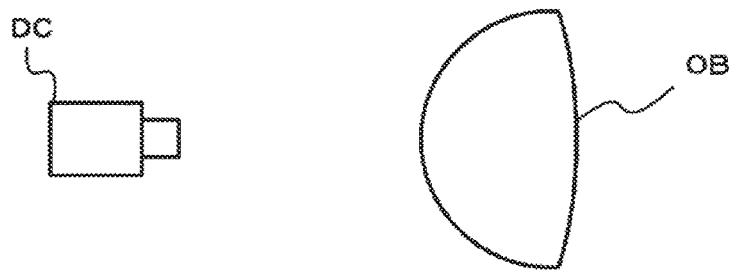
FIGS. 8(a), 8(b) and 8(c) depicts diagrams illustrating a 180-degree uncertainty.
Figure 8B:
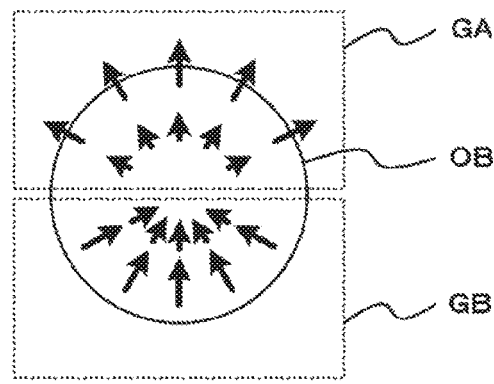
Figure 8C:
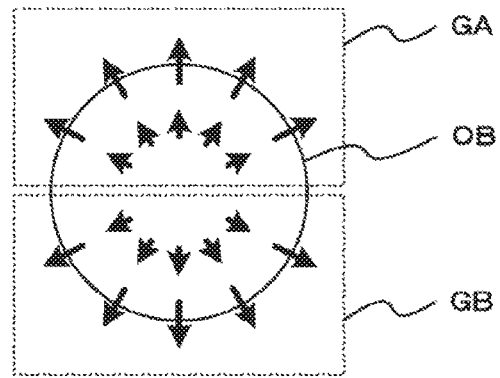

The normal lines calculated as described above have a 180-degree uncertainty. FIGS. 8(a), 8(b) and 8(c) depicts diagrams illustrating a 180-degree uncertainty. When the normal lines are to be calculated by allowing the imaging section DC to capture an image of the object OB depicted in FIG. brightness changes caused by rotation in the polarization direction have a 180-degree periodicity. Therefore, the direction of the normal lines (indicated by an arrow) in an upper half region GA of the object OB may be correct as indicated in FIG. 8(b); however, the direction of the normal lines in a lower half region GB may be reversed.

The temporary recognition process image generation section 302 generates a temporary recognition process image based on the plurality of polarized images acquired by the polarized image acquisition section 20. The temporary recognition process image generation section 302 calculates, for example, the average of a plurality of polarized images in order to generate a temporary recognition process image equivalent to a captured image (normal image) that is acquired without using a polarizing plate or a polarizing filter. Also, the temporary recognition process image generation section 302 may extract a polarized image having a single polarization direction from a plurality of polarized images and use the extracted polarized image as the temporary recognition process image. Also, the temporary recognition process image generation section 302 may use the plurality of acquired polarized images as the temporary recognition process image. Further, the temporary recognition process image generation section 302 may use both a normal image and a polarized image as the temporary recognition process image. The temporary recognition process image generation section 302 outputs the temporary recognition process image to the temporary recognition processing section 303.

The temporary recognition processing section 303 uses the temporary recognition process image, which is generated by the temporary recognition process image generation section 302, in order to temporarily recognize the recognition target object. The temporary recognition processing section 303 performs object recognition by using the temporary recognition process image and determines, for example, the type, position, and posture of the recognition target object. The temporary recognition processing section 303 uses, for example, the temporary recognition process image and the images (normal images and polarized images) of models of various objects stored in advance in the model database section 304 in order to determine the model closest to the recognition target object. If the temporary recognition process image generated by the temporary recognition process image generation section 302 includes a polarized image, the temporary recognition processing section 303 additionally takes polarization characteristics into consideration in order to determine the model closest to the recognition target object. The temporary recognition processing section 303 outputs the determined model to the uncertainty resolution section 305 as a temporary recognition result. The temporary recognition processing section 303 may use an object recognition method other than a model fitting method in order to temporarily recognize the recognition target object.

The uncertainty resolution section 305 resolves the uncertainty of the normal lines calculated by the polarization processing section 301 in accordance with the temporary recognition result supplied from the temporary recognition processing section 303. As mentioned earlier, the temporary recognition result includes information about, for example, the type, position, and posture of the recognition target object. Therefore, the uncertainty resolution section 305 resolves the uncertainty of normal lines from normal line directions having a 180-degree phase difference from the normal lines in accordance with the model indicated by the temporary recognition result. That is to say, the uncertainty resolution section 305 resolves the uncertainty of the normal lines by identifying the normal line directions in accordance with the shape of the recognition target object, and outputs the resulting uncertainty-free normal lines to the UI processing section 41.

The UI processing section 41 recognizes the object by using the uncertainty-free normal lines generated by the normal line calculation section 31. The UI processing section 41 regards the recognition target object in the polarized images, which are acquired by the polarized image acquisition section 20, as the input indicator for the user interface. The UI processing section 41 performs object recognition based on the normal lines calculated by the normal line calculation section 31 and generates input information on the user interface (hereinafter referred to as the "UI information"). As mentioned earlier, the normal lines represent information indicative of the three-dimensional shape of the recognition target object. The UI processing section 41 performs object recognition to recognize, for example, the type, position, and posture of the recognition target object, and outputs the result of recognition as the UI information.

<2-2. Operation of First Embodiment>

Figure 9:
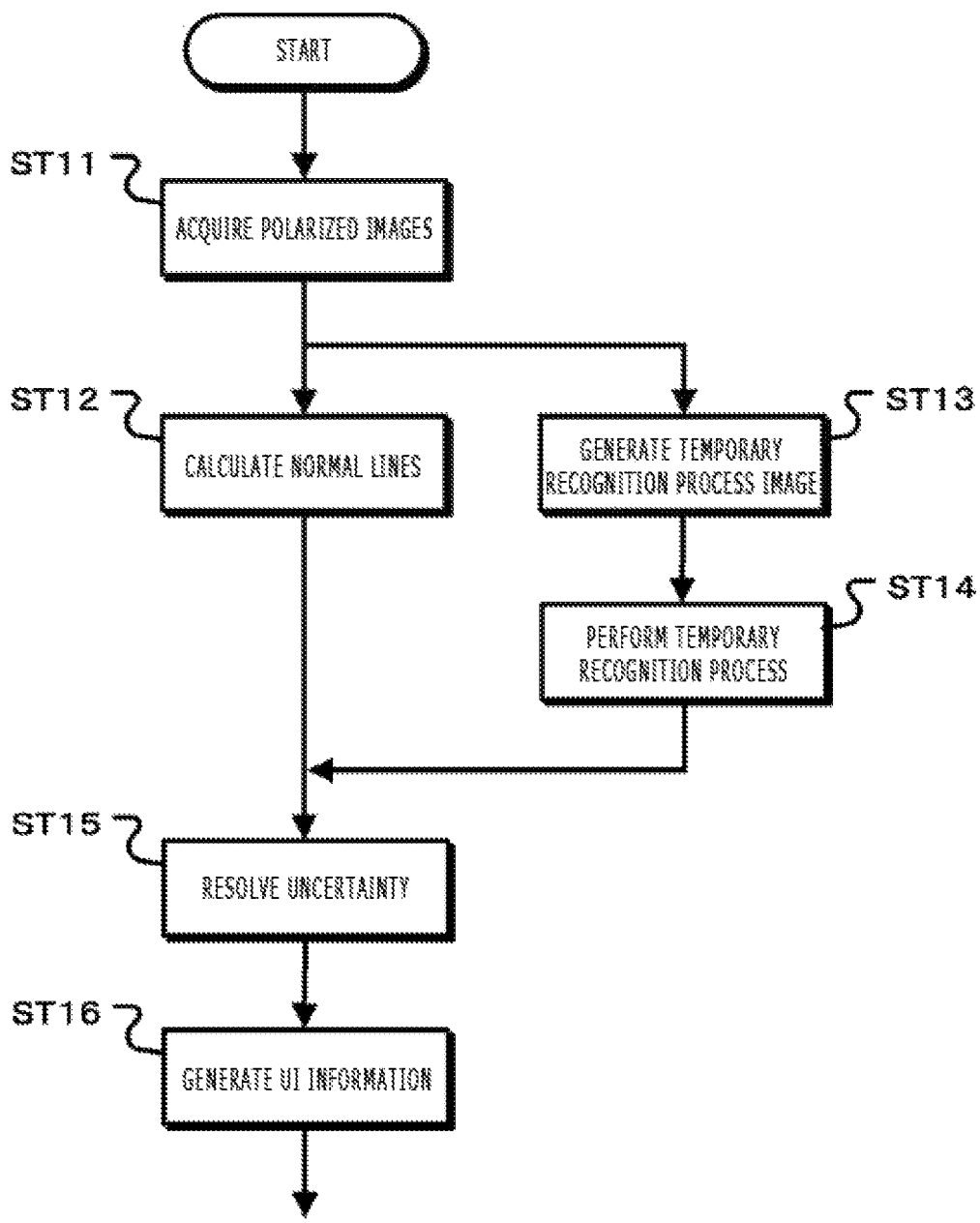
FIG. 9 is a flowchart illustrating an operation of the first embodiment.

FIG. 9 is a flowchart illustrating an operation of the first embodiment. In step ST11, the polarized image acquisition section 20 acquires the polarized images. The polarized image acquisition section 20 performs an imaging operation by using a polarizing plate or a polarizing filter and acquires a plurality of polarized images having different polarization directions. Upon completion of step ST11, processing proceeds to steps ST12 and ST13.

In step ST12, the normal line calculation section 31 calculates the normal lines. The normal line calculation section 31 fits the pixel values of individual pixels in a plurality of polarized images having different polarization directions to the model equation, and calculates the normal lines based on the model equation obtained upon fitting. Upon completion of step ST12, processing proceeds to step ST15.

In step ST13, the normal line calculation section 31 generates the temporary recognition process image. The normal line calculation section 31 averages the pixel values of individual pixels in a plurality of polarized images that are generated, for example, in step ST11 and have different polarization directions, and regards the resulting average values as the pixel values of the temporary recognition process image (equivalent to a normal image). Upon completion of step ST13, processing proceeds to step ST14.

In step ST14, the normal line calculation section 31 performs a temporary recognition process. The normal line calculation section 31 performs fitting by using, for example, the temporary recognition process image and a stored model, and recognizes, for example, the type, position, and posture of the recognition target object. Upon completion of step ST14, processing proceeds to step ST15.

In step ST15, the normal line calculation section 31 resolves the uncertainty of the normal lines. The normal line calculation section 31 resolves the uncertainty of the normal lines calculated in step ST12, namely, the uncertainty of the normal lines having a 180-degree uncertainty, in accordance with the temporary recognition result obtained in step ST14, that is, in accordance, for instance, with the type, position, and posture of the recognition target object. Upon completion of step ST15, processing proceeds to step ST16.

In step ST16, the UI processing section 41 generates the UI information. Based on the uncertainty-free normal lines, the UI processing section 41 recognizes, for example, the type, position, and posture of the recognition target object, and regards the result of recognition as the UI information.

<2-3. First Concrete Example of First Embodiment>

A first concrete example of the first embodiment will now be described. In the first concrete example, the recognition target object is a hand, and the temporary recognition processing section recognizes the positions of a fingertip and finger pulp of the hand by using the temporary recognition process image and the images of pre-registered models. Further, the uncertainty resolution section resolves the uncertainty of the normal lines of the finger region of the hand in accordance with the positions of the fingertip and finger pulp temporarily recognized by the temporary recognition processing section. The recognition section determines a finger pointing direction in accordance with the uncertainty-free normal lines of the finger region.

Figure 10:
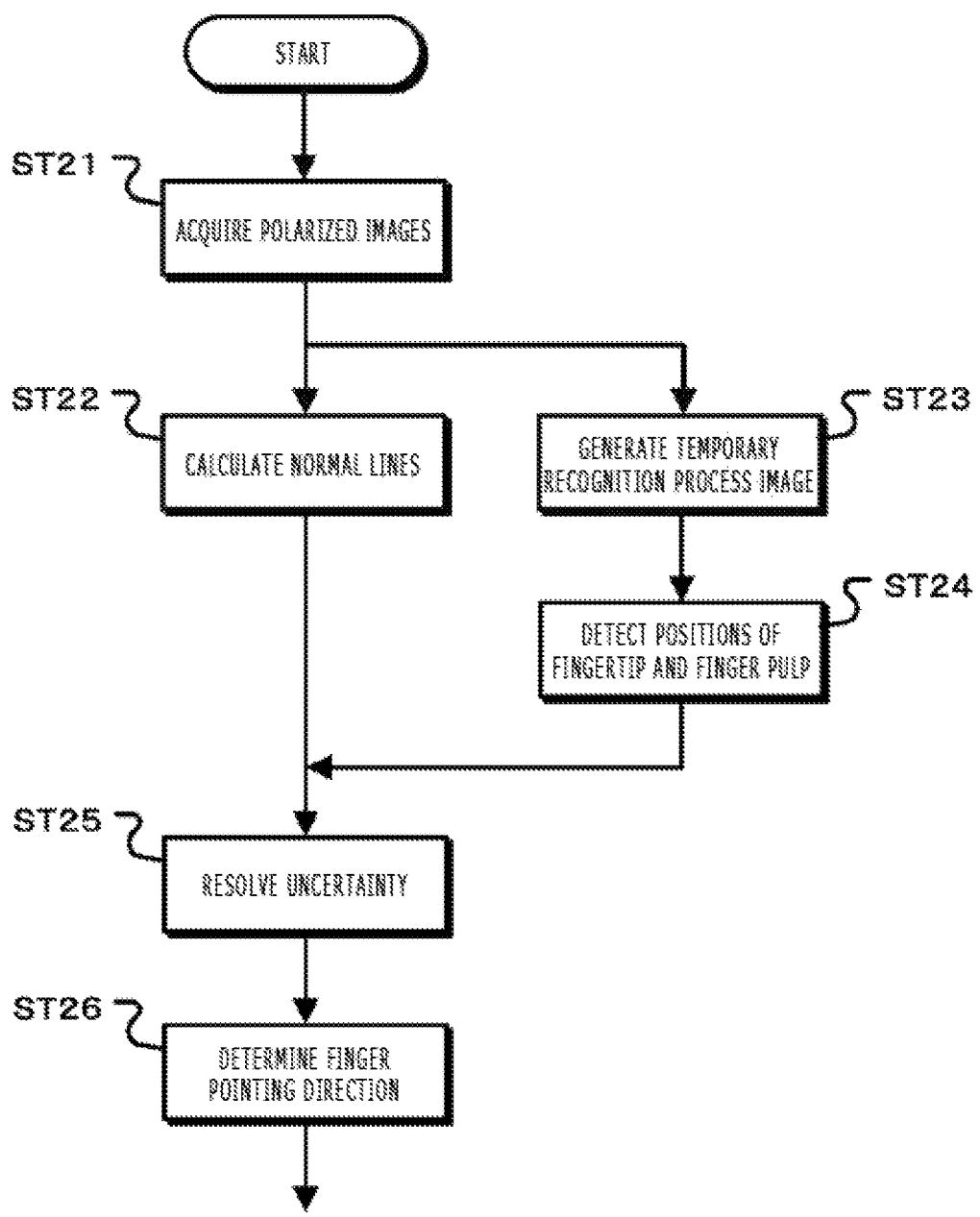
FIG. 10 is a flowchart illustrating an operation of a first concrete example according to the first embodiment.

FIG. 10 is a flowchart illustrating an operation of the first concrete example according to the first embodiment. In step ST21, the polarized image acquisition section 20 acquires polarized images. The polarized image acquisition section 20 uses a polarizing plate or a polarizing filter to capture an image of the hand that points to a direction. Further, the polarized image acquisition section 20 acquires a plurality of polarized images having different polarization directions. Upon completion of step S21, processing proceeds to steps ST22 and ST23.

In step ST22, the normal line calculation section 31 calculates the normal lines. The normal line calculation section 31 fits the pixel values of individual pixels in the polarized images having different polarization directions to the model equation, and calculates the normal lines based on the model equation obtained upon fitting. Upon completion of step ST22, processing proceeds to step ST25.

In step ST23, the normal line calculation section 31 generates the temporary recognition process image. The normal line calculation section 31 averages the pixel values of individual pixels in a plurality of polarized images that are generated, for example, in step ST21 and have different polarization directions, and regards the resulting average values as the pixel values of the temporary recognition process image (equivalent to a normal image). Upon completion of step ST23, processing proceeds to step ST24.

Figure 11:
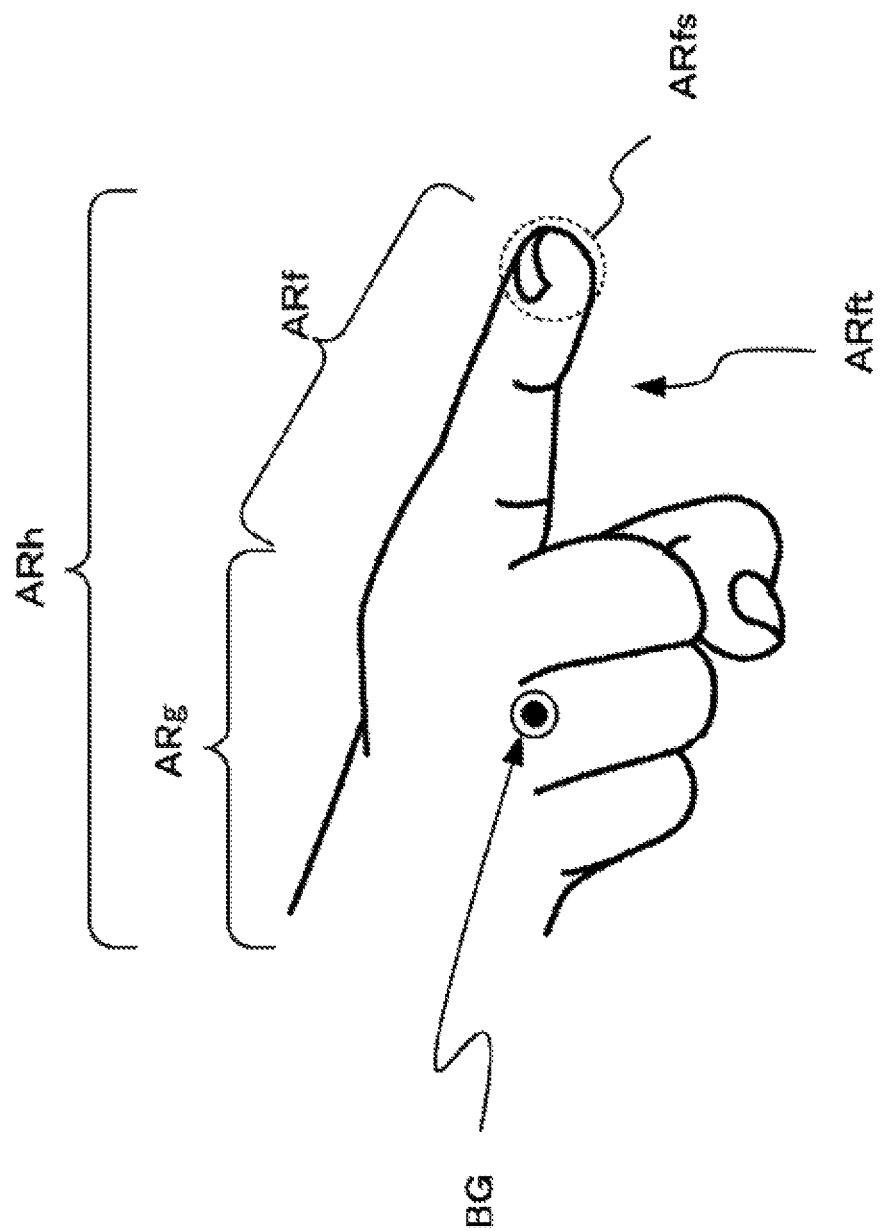
FIG. 11 is a diagram illustrating the result of detection of the outline of a hand.

In step ST24, the normal line calculation section 31 detects the positions of the fingertip and finger pulp. The normal line calculation section 31 uses an image recognition technology to detect a fingertip region and a finger pulp region from the temporary recognition process image. As described the document, for example, in "S. K. Kang, M. Y. Nam, and P. K. Rhee, 'Color Based Hand and Finger Detection Technology for User Interaction,' International Conference on Convergence and Hybrid Information Technology, pp. 229-236, 2008," the normal line calculation section 31 extracts a skin color image region from a color temporary recognition process image, and performs edge detection within an edge region of the extracted image region to detect the outline of the hand. FIG. 11 illustrates the result of detection of the outline of the hand. The image region within the outline of the hand is a hand region ARh.

Next, the normal line calculation section 31 detects the finger region from the hand region. The normal line calculation section 31 performs a morphology opening process on the hand region. In the morphology opening process, a small object within an image is first eliminated to maintain the shape and size of a large object. That is to say, when the morphology opening process is performed on the hand region, the finger region thinner than the palm of the hand is first eliminated. Therefore, the finger region can be detected by calculating the difference between an image obtained before the morphology opening process and an image obtained after the morphology opening process.

Also, the finger region may be detected by using a different method. For example, the external shape of a finger may be regarded as being formed by a plurality of projected hulls. The finger region can then be determined in accordance with the result of detection of the projected hulls from the hand region. The projected hulls can easily be detected, for example, by using a method of acquiring projected hulls available from the open source computer vision library (OpenCV). Consequently, a finger region ARf can be detected as illustrated in FIG. 11.

The normal line calculation section 31 separates the detected finger region into the fingertip region and the finger pulp region. As illustrated in FIG. 11, the normal line calculation section 31 regards a difference region between the hand region ARh and the detected finger region ARf as a first region ARg. Further, the normal line calculation section 31 separates the finger region ARf into a fingertip region ARfs and a finger pulp region ARft. The fingertip region ARfs is a region farthest from a gravity center BG of the first region ARg. The finger pulp region ARft is the remaining portion of the finger region ARf.

Figure 12B:
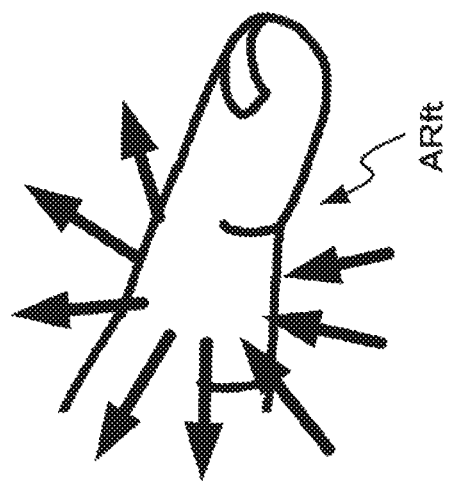
FIGS. 12(a) and 12(b) depicts diagrams illustrating the normal lines of a finger pulp region.
Figure 12A:
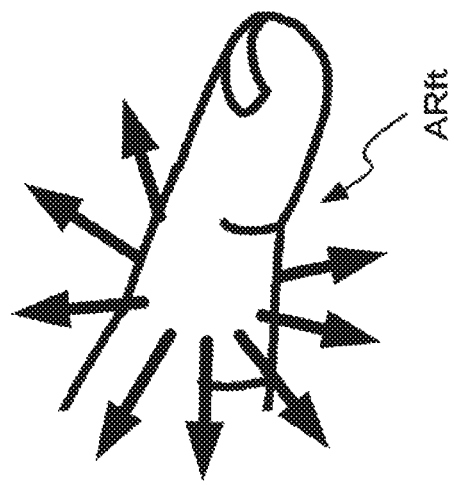

In step ST25, the normal line calculation section 31 resolves the uncertainty of the normal lines. The normal line calculation section 31 regards the external shape of a finger as being projected, and in accordance with the result of detection in step ST24, resolves the uncertainty of the normal lines that correspond to the finger region and have a 180-degree uncertainty, namely, the normal lines calculated in step ST22. Upon completion of step ST25, processing proceeds to step ST26. FIGS. 12(a) and 12(b) illustrate the normal lines of the finger pulp region. FIG. 12(a) illustrates the normal lines of the finger pulp region ARft that is obtained before uncertainty resolution. FIG. 12(b) illustrates the normal lines of the finger pulp region ARft that is obtained upon uncertainty resolution.

In step ST26, the UI processing section 41 determines the finger pointing direction. Based on the uncertainty-free normal lines of the finger region, the UI processing section 41 determines the direction in which the fingertip is pointed, that is, the finger pointing direction, and regards the result of determination as the UI information.

Figure 13:
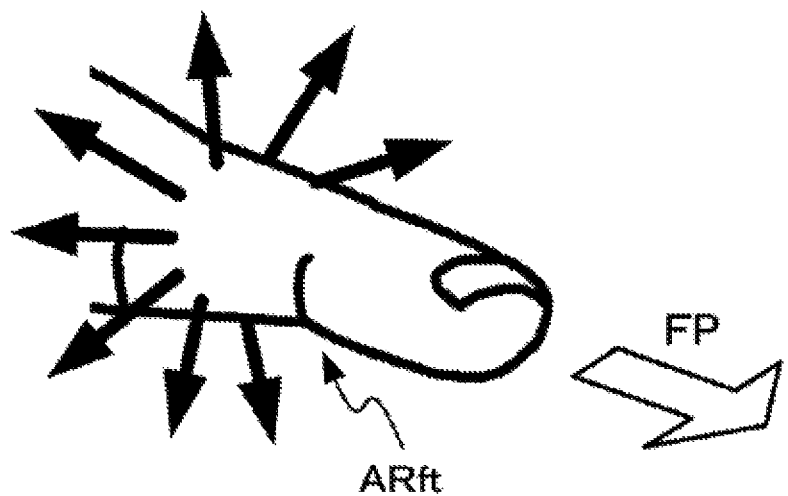
FIG. 13 is a diagram illustrating a finger pointing direction.

As illustrated in FIG. 13, the finger pointing direction is a direction fs that is substantially orthogonal to the normal lines of the finger pulp region ARft. Therefore, when, for instance, a finger pointing operation performed by a user facing the polarized image acquisition section 20 is to be identified, a direction FP that is orthogonal to the normal lines of the finger pulp region and oriented from the rear to the front of an image is regarded as the finger pointing direction by the UI processing section 41.

When a vector p in the finger pointing direction is equal to Equation (3) and a vector n in the normal line direction of the finger pulp region is equal to Equation (4), the inner product of the vector p and the vector n is "0" as indicated by Equation (5). Therefore, as regards the normal lines at a plurality of positions (e.g., k positions) in the finger pulp region, that is, normal lines N indicated in Equation (6), the UI processing section 41 determines the vector p satisfying Equation (7) under limiting conditions defined by Equation (8).

Mathematical 3

$$p = [\, p_x \quad p_y \quad p_z \,]^T \tag{3}$$

$$n = \begin{bmatrix} n_x \\ n_y \\ n_z \end{bmatrix} \tag{4}$$

$$p \cdot n = 0 \tag{5}$$

$$N = \begin{bmatrix} n_x^1 & n_y^1 & n_z^1 \\ n_x^2 & n_y^2 & n_z^2 \\ n_x^3 & n_y^3 & n_z^3 \\ \vdots & \vdots & \vdots \\ n_x^k & n_y^k & n_z^k \end{bmatrix} \tag{6}$$

$$\operatorname{argmin} \|Np\|^2 = \operatorname{argmin}(p^T N^T N p)^2 \tag{7}$$

$$\|p\| = 1 \tag{8}$$

When a function W is defined as indicated in Equation (9), the minimum function in Equation (7) can be defined as a function C as indicated by Equation (10). That is to say, the vector p minimizing the function C under the limiting conditions defined by Equation (8) should be determined. The method of Lagrange multipliers is used to calculate the vector P that minimizes the function C. When the method of Lagrange multipliers is used, Equation (10) can be replaced by Equation (11), which uses a Lagrange multiplier λ. Therefore, the vector p satisfying Equation (7) can be calculated by determining the vector p satisfying a characteristic equation indicated as Equation (12). The vector p satisfying the characteristic equation is established when the vector P is a characteristic vector of the function W, and the value of λ corresponds to a characteristic value. In this instance, when the characteristic vector of the function W is substituted as the vector p, the minimum value of the function C is equal to λ. Thus, the vector p satisfying Equation (7) is a characteristic vector corresponding to the minimum characteristic value of the function W.

Mathematical 4

$$W = N^T N \quad (9)$$

$$C = p^T W p \quad (10)$$

$$C = p^T W p + \lambda(1 - p^T p) \quad (11)$$

$$\frac{dC}{dp} = 2Wp - 2\lambda p = 0 \quad (12)$$

Figure 14:
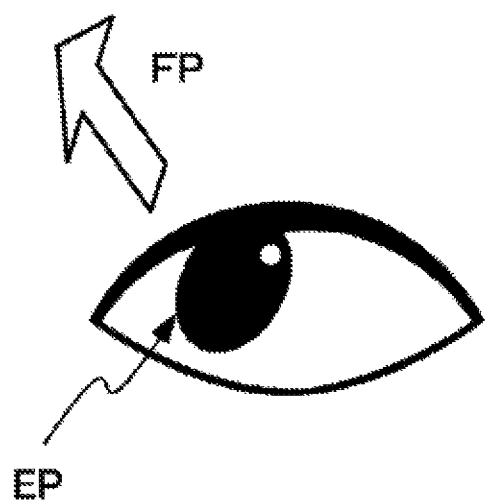
FIG. 14 is a diagram illustrating a sight line direction.

Performing the above-described process makes it possible to determine the finger pointing direction more accurately than when a distance image is used. Also, the first concrete example illustrates a case where the finger pointing direction is to be determined. However, as illustrated in FIG. 14, the position of the iris of an eye EP can also be detected to determine a sight line direction FP depending on the direction in which the iris of the eye EP is shifted from the center and on the distance of such a shift.

<2-4. Second Concrete Example of First Embodiment>

A second concrete example of the first embodiment will now be described. In the second concrete example, the recognition target object is a face, and the temporary recognition processing section recognizes the position of a face region by using the temporary recognition process image and the images of pre-registered models. Also, the uncertainty resolution section resolves the uncertainty of the normal lines of the face in accordance with the position of the face temporarily recognized by the temporary recognition processing section. The recognition section determines the shape or expression of the face in accordance with the uncertainty-free normal lines of the face region.

Figure 15:
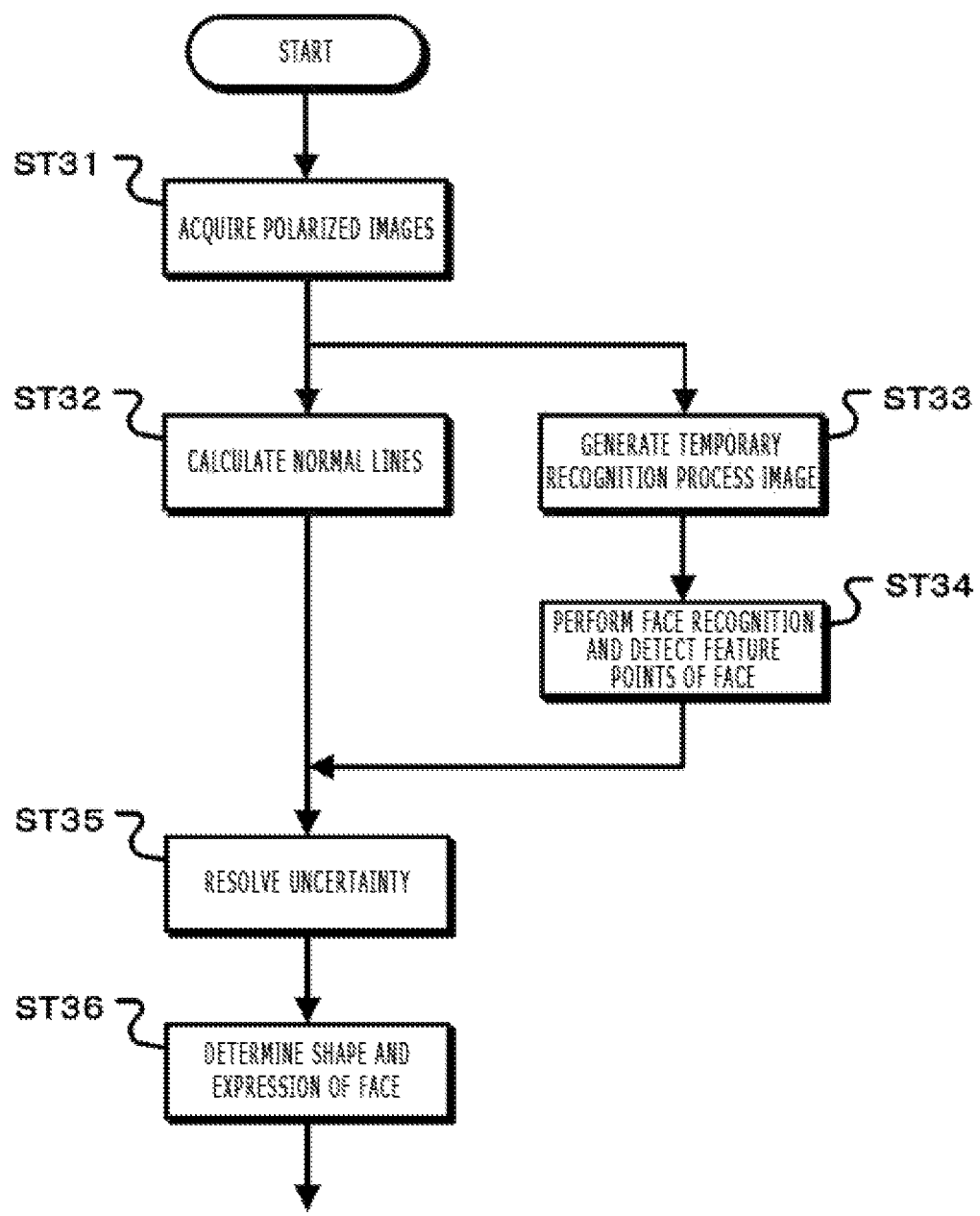
FIG. 15 is a flowchart illustrating an operation of a second concrete example according to the first embodiment.

FIG. 15 is a flowchart illustrating an operation of the second concrete example according to the first embodiment. In step ST31, the polarized image acquisition section 20 acquires polarized images. The polarized image acquisition section 20 uses a polarizing plate or a polarizing filter to capture an image of the face. Further, with a color filter disposed in the imaging section, the polarized image acquisition section 20 acquires a plurality of color polarized images having different polarization directions. Upon completion of step ST31, processing proceeds to steps ST32 and ST33.

In step ST32, the normal line calculation section 31 calculates the normal lines. The normal line calculation section 31 fits the pixel values of individual pixels in the polarized images having different polarization directions to the model equation, and calculates the normal lines based on the model equation obtained upon fitting. Upon completion of step ST32, processing proceeds to step ST35.

In step ST33, the normal line calculation section 31 generates the temporary recognition process image. The normal line calculation section 31 averages the pixel values of individual pixels in a plurality of polarized images that are generated, for example, in step ST31 and have different polarization directions, and regards the resulting average values as the pixel values of the temporary recognition process image (equivalent to a normal image). Upon completion of step ST33, processing proceeds to step ST34.

In step ST34, the normal line calculation section 31 performs face recognition and detects the feature points of the face. The normal line calculation section 31 uses a face recognition technology to detect the position of the face from the temporary recognition process image. Further, the normal line calculation section 31 detects the feature points of the face by using active shape models that are disclosed the document, for example, in "T. F. Cootes, C. J. Taylor, D. H. Cooper, and J. Graham: 'Active Shape Models—Their Training and Application,' Computer Vision and Image Understanding, Vol. 16, No. 1, January, pp. 38-59, 1995." The active shape models achieve automatic detection of feature points that determine the posture of an imaged recognition target object. More specifically, a plurality of learning images having appropriately disposed feature points are manually prepared, and then an intermediate shape of the recognition target object is generated from the prepared learning images. Subsequently, the recognition target object is searched for by changing the position of the intermediate shape relative to an image to be recognized. In such an instance, brightness changes in the peripheries of the feature points in the intermediate shape are observed to perform template matching. These searches are repeated at individual resolutions of an image pyramid from low to high resolutions. The normal line calculation section 31 performs the above-described process to detect the feature points of the face. Upon completion of step ST34, processing proceeds to step ST35.

Figure 16:
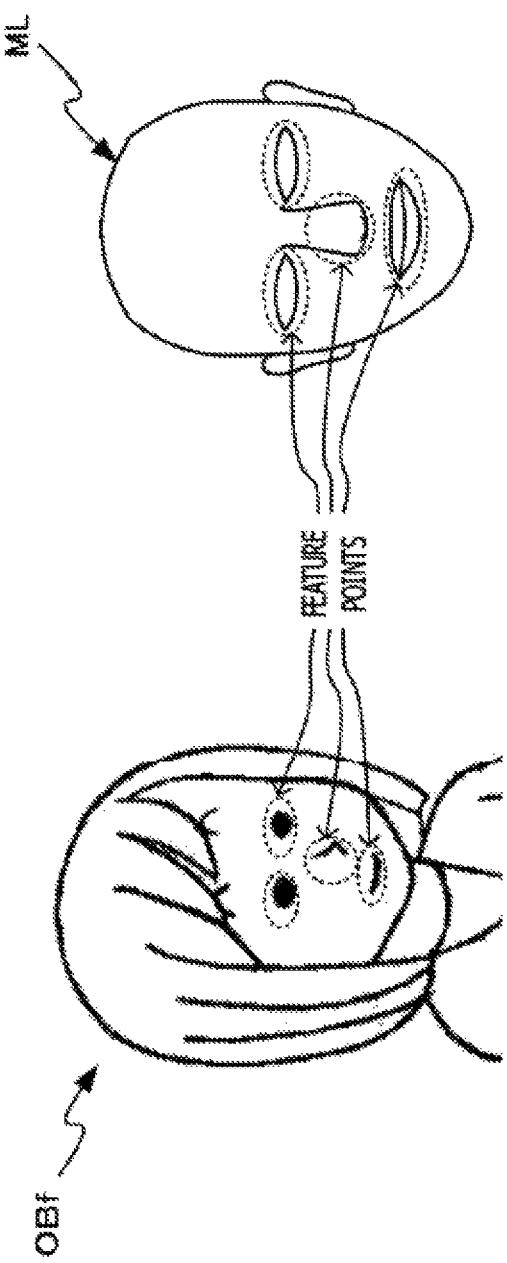
FIG. 16 is a diagram illustrating the determination of the three-dimensional shape of a face and the orientation of the face.

In step ST35, the normal line calculation section 31 resolves the uncertainty of the normal lines. The normal line calculation section 31 determines the three-dimensional shape and orientation of the face from the positional relationship between the face feature points detected in step ST34 and stored feature points of a three-dimensional model. As illustrated in FIG. 16, the normal line calculation section 31 determines the three-dimensional shape and orientation of the face from the positional relationship between the feature points (e.g., eyes, nose, and mouse) of a face OBf and a three-dimensional model ML. Further, based on the determined three-dimensional shape and orientation of the face and in accordance with the result of detection in step ST34, the normal line calculation section 31 resolves the uncertainty of the normal lines that are calculated in step ST32, have a 180-degree uncertainty, and correspond to the face region. Upon completion of step ST35, processing proceeds to step ST36.

In step ST36, the UI processing section 41 determines the shape and expression of the face. Based on the uncertainty-free normal lines of the face region, the UI processing section 41 determines the detailed shape and expression of the face and regards the result of determination as the UI information. For example, the UI processing section 41 determines the detailed shape of the face by integrating the uncertainty-free normal lines of the face region and determines the facial expression from the detailed shape of the face. For the determination of the shape and expression of the face, for example, distance image information and three-dimensional shape model may be used.

Performing the above-described process makes it possible to determine the shape and expression of the face more accurately than when a distance image is used. The second concrete example illustrates a case where face recognition is to be performed. However, a known object can also be recognized when, for example, a three-dimensional model of the known object is prepared.

<2-5. Third Concrete Example of First Embodiment>

A third concrete example of the first embodiment will now be described. In the third concrete example, the recognition target object is a hand, and the temporary recognition processing section recognizes the position and skeletal structure of a hand region by using the temporary recognition process image and the images of pre-registered models. Further, the uncertainty resolution section resolves the uncertainty of the normal lines of the hand region in accordance with the position and skeletal structure of the hand region that are temporarily recognized by the temporary recognition processing section. The recognition section determines the shape of the hand in accordance with the uncertainty-free normal lines of the hand region.

Figure 17:
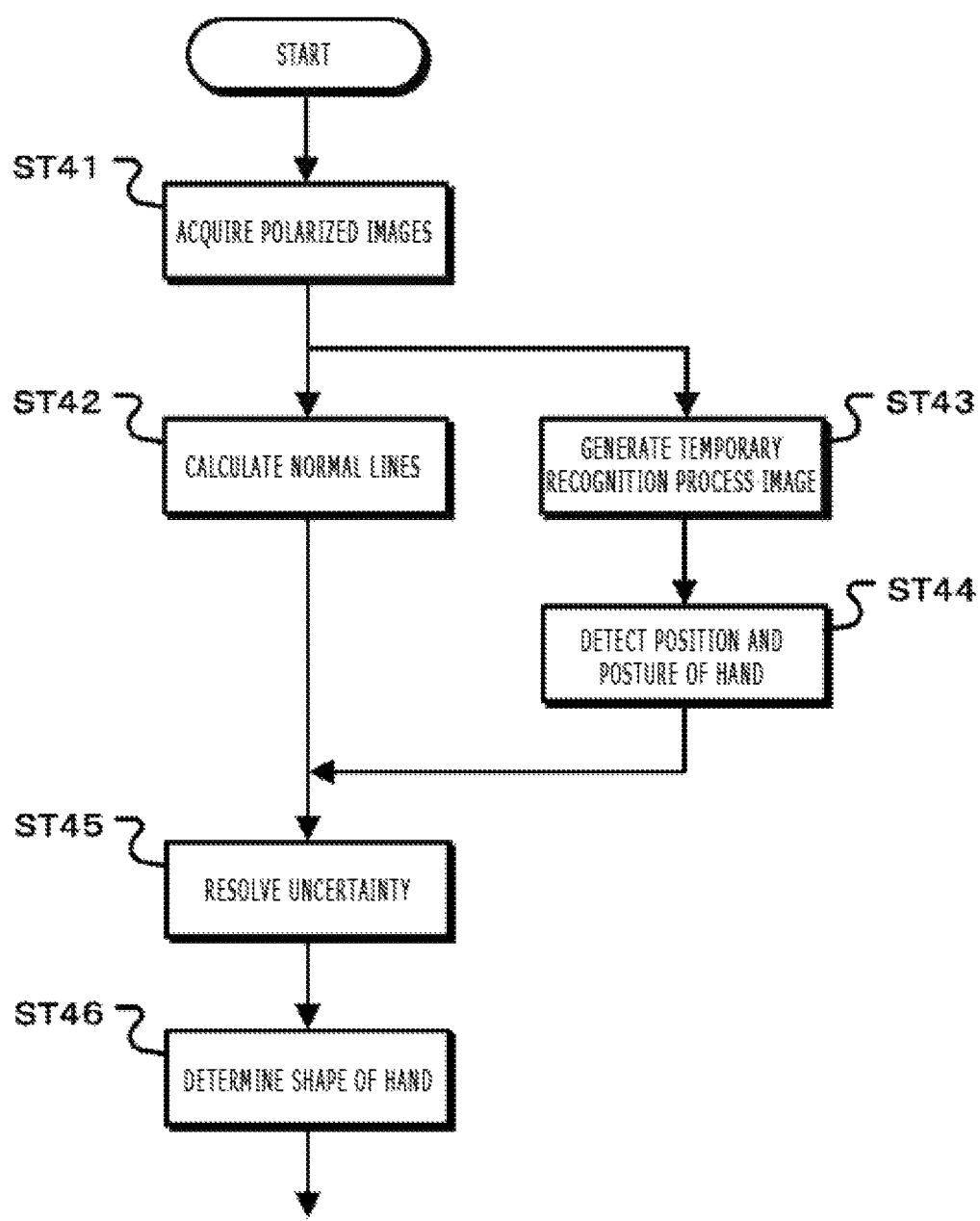
FIG. 17 is a flowchart illustrating an operation of a third concrete example according to the first embodiment.

FIG. 17 is a flowchart illustrating an operation of the third concrete example according to the first embodiment. In step ST41, the polarized image acquisition section 20 acquires polarized images. The polarized image acquisition section 20 uses a polarizing plate or a polarizing filter to capture an image of the hand. Further, with a color filter disposed in the imaging section, the polarized image acquisition section 20 acquires a plurality of color polarized images having different polarization directions. Upon completion of step ST41, processing proceeds to steps ST42 and ST43.

In step ST42, the normal line calculation section 31 calculates the normal lines. The normal line calculation section 31 fits the pixel values of individual pixels in the polarized images having different polarization directions to the model equation, and calculates the normal lines based on the model equation obtained upon fitting. Upon completion of step ST42, processing proceeds to step ST45.

In step ST43, the normal line calculation section 31 generates the temporary recognition process image. The normal line calculation section 31 averages the pixel values of individual pixels in a plurality of polarized images that are generated, for example, in step ST41 and have different polarization directions, and regards the resulting average values as the pixel values of the temporary recognition process image (equivalent to a normal image). Upon completion of step ST43, processing proceeds to step ST44.

Figure 18:
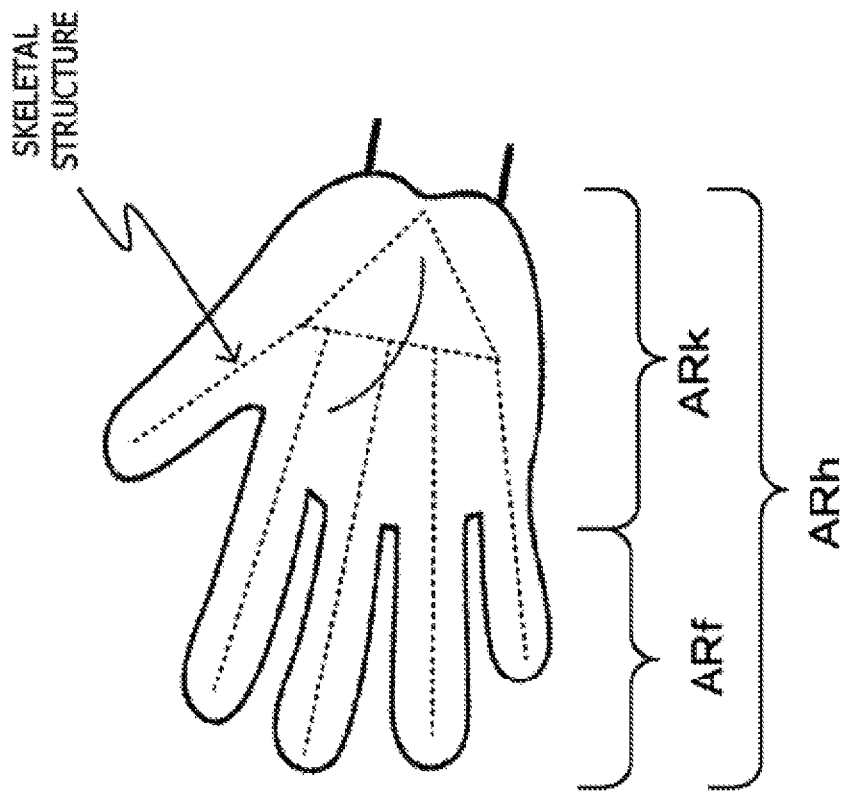
FIG. 18 is a diagram illustrating an operation performed to detect the skeletal structure of a hand.

In step ST44, the normal line calculation section 31 detects the position and posture of the hand. The normal line calculation section 31 performs processing in the same manner as in step ST24 to detect the region of a first or palm and the fingertip region, and detects the skeletal structure of the hand by connecting the fingertip to the gravity center of the region of the first or palm. FIG. 18 is a diagram illustrating an operation performed to detect the skeletal structure of the hand. The normal line calculation section 31 detects a palm region ARk and a finger region ARf, and then detects the skeletal structure of the hand by connecting the gravity center of the palm region ARk to the leading end of the finger region ARf as indicated by broken lines.

The normal line calculation section 31 determines a fitting error between the detected skeletal structure of the hand and a stored skeletal structure model of each hand posture, and regards the posture of a skeletal structure model minimizing the fitting error as the imaged hand posture. While, for example, the gravity center of the detected skeletal structure of the hand coincides with the gravity center of a stored skeletal structure model, the normal line calculation section 31 calculates the sum of absolute difference (SAD) of position coordinates, for example, of a joint or a fingertip on an individual skeletal structure model basis. The normal line calculation section 31 regards a posture having the smallest calculated SAD as the imaged hand posture. After detecting the position and posture of the hand in the above manner, the normal line calculation section 31 proceeds to step ST45.

In step ST45, the normal line calculation section 31 resolves the uncertainty of the normal lines. Based on the position and posture of the hand detected in step ST44, the normal line calculation section 31 resolves the uncertainty of the normal lines that are calculated in step ST42, have a 180-degree uncertainty, and correspond to the hand region. Upon completion of step ST45, processing proceeds to step ST46.

In step ST46, the UI processing section 41 determines the shape of the hand. Based on the uncertainty-free normal lines of the hand region, the UI processing section 41 determines the shape of the hand and regards the result of determination as the UI information. For example, the UI processing section 41 determines the detailed shape of the hand by integrating the uncertainty-free normal lines of the hand region. For the determination of the shape of the hand, for example, distance image information and three-dimensional shape model may be used.

Performing the above-described process makes it possible to determine the shape of the hand more accurately than when a distance image is used. Also, the third concrete example may be applied to determine not only the shape of the hand but also the finger pointing direction. In such an instance, in step ST44, the normal line calculation section 31 performs fitting between the finger region detected in like manner in step ST24 and a stored finger shape model for each finger pointing direction. For the fitting, the detected finger region (or hand region) is positioned to overlap the finger region (or hand region) of the finger shape model while the fingertip region detected in like manner in step ST24 is used as a fulcrum. The UI processing section 41 regards the posture of a finger shape model minimizing the fitting error, that is, the overlap error, as the finger pointing direction of the imaged hand.

Also, the operations described by using the flowcharts in accordance with the first embodiment are not limited to a case where a process of generating normal lines having uncertainty is performed in parallel with a process of generating the temporary recognition process image and temporarily recognizing the recognition target object. An alternative, for example, is to perform one of the two processes and then perform the remaining process.

3. Second Embodiment

Incidentally, the above-described first embodiment has been described on the assumption that the UI information is generated based on uncertainty-free normal lines. However, the UI information may be generated based on normal lines having uncertainty. A second embodiment will now be described on the assumption that the UI information is generated based on normal lines having uncertainty.

<3-1. Configuration of Second Embodiment>

Figure 19:
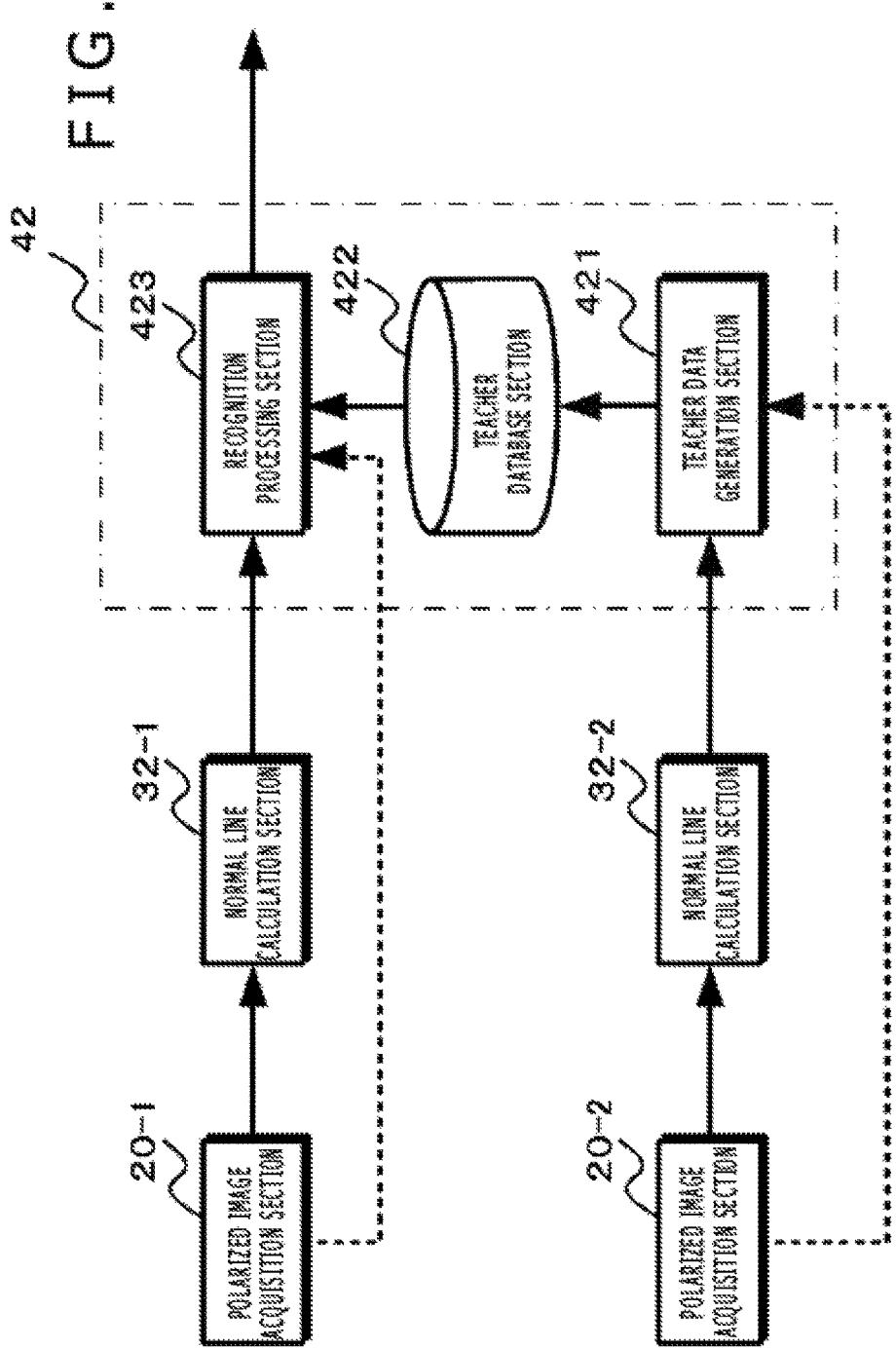
FIG. 19 is a diagram illustrating a configuration of an image processing apparatus according to a second embodiment.

FIG. 19 is a diagram illustrating a configuration of an image processing apparatus according to the second embodiment. An image processing apparatus 12 includes polarized image acquisition sections 20-1 and 20-2, normal line calculation sections 32-1 and 32-2, and a user interface (UI) processing section 42.

The polarized image acquisition sections 20-1 and 20-2 acquire a plurality of polarized images having different polarization directions. The polarized image acquisition sections 20-1 and 20-2 are configured similarly to the polarized image acquisition section 20 in the first embodiment. The polarized image acquisition section 20-1 acquires a plurality of polarized images that show the recognition target object and have different polarization directions, and outputs the acquired polarized images to the normal line calculation section 32-1. The polarized image acquisition section 20-2 acquires a plurality of polarized images that show a learning object and have different polarization directions, and outputs the acquired polarized images to the normal line calculation section 32-2. Also, the polarized image acquisition sections 20-1 and 20-2 may output the acquired polarized images to the UI processing section 42.

The normal line calculation section 32-1 (32-2) calculates the normal lines from a plurality of polarized images acquired by the polarized image acquisition section 20-1 (20-2). The normal line calculation section 32-1 (32-2) is configured by using the polarization processing section 301 of the normal line calculation section 31 in the first embodiment. The normal line calculation section 32-1 performs processing in a similar manner to the above-mentioned polarization processing section 301 to calculate the normal lines from the polarized images to be recognized, which are acquired by the polarized image acquisition section 20-1, and outputs the calculated normal lines to the UI processing section 42. Similarly, the normal line calculation section 32-2 calculates the normal lines from the polarized images of the learning object, which are acquired by the polarized image acquisition section 20-2, and outputs the calculated normal lines to the UI processing section 42.

The UI processing section 42 regards the recognition target object, which is shown in the polarized images acquired by the polarized image acquisition section 20-1, as the input indicator for the user interface. Further, based on the normal lines that are calculated by the normal line calculation section 32-1 and still have uncertainty, the UI processing section 42 performs object recognition and generates input information on the user interface (hereinafter referred to as the "UI information"). As mentioned earlier, the normal lines represent information indicative of the three-dimensional shape of the recognition target object. The UI processing section 42 performs object recognition to recognize, for example, the type, position, and posture of the recognition target object, and outputs the result of recognition as the UI information. Further, the UI processing section 42 stores, in advance, teacher data based on the learning object and, in accordance with the stored teacher data and the student data calculated based on the polarized images that show the recognition target object and have different polarization directions, performs a recognition process on the recognition target object.

The UI processing section 42 includes a teacher data generation section 421, a teacher database section 422, and a recognition processing section 423.

The teacher data generation section 421 generates teacher data based on the learning object by using the normal lines calculated by the normal line calculation section 32-2, and causes the teacher database section 422 to store the generated teacher data. Additionally, the teacher data generation section 421 may generate non-polarized images (normal images) by using the polarized images supplied from the polarized image acquisition section 20-2, and generate the teacher data by using the feature amount calculated from the non-polarized images and the acquired normal lines.

The teacher database section 422 stores the teacher data generated by the teacher data generation section 421. Further, the teacher database section 422 outputs the stored teacher data to the recognition processing section 423.

The recognition processing section 423 generates the student data based on the normal lines calculated by the normal line calculation section 32-1, performs a recognition process by using the generated student data and the teacher data stored in the teacher database section 422, and generates the UI information. Additionally, the recognition processing section 423 may generate non-polarized images (normal images) by using the polarized images supplied from the polarized image acquisition section 20-1, and generate the student data by using the feature amount calculated from the non-polarized images and the acquired normal lines.

<3-2. Operation of Second Embodiment>

Figure 20:
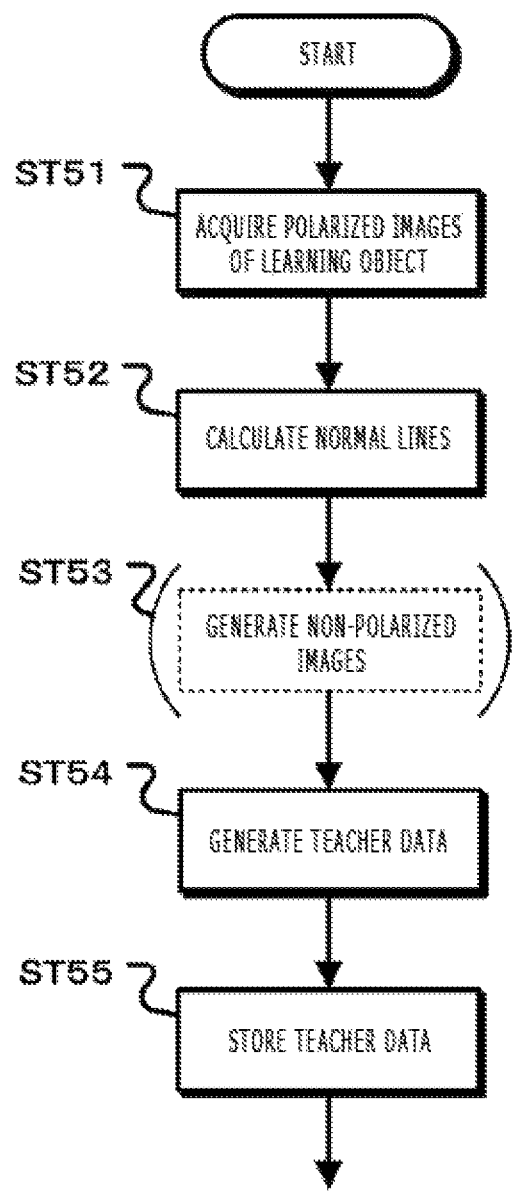
FIG. 20 is a flowchart illustrating a learning operation.

An operation of the second embodiment will now be described. FIG. 20 is a flowchart illustrating a learning operation. In step ST51, the polarized image acquisition section 20-2 acquires polarized images of the learning object. The polarized image acquisition section 20-2 uses a polarizing plate or a polarizing filter to acquire a plurality of polarized images that show the learning object and have different polarization directions. Upon completion of step ST51, processing proceeds to step ST52.

In step ST52, the normal line calculation section 32-2 calculates the normal lines. The normal line calculation section 32-2 fits the pixel values of individual pixels in the polarized images having different polarization directions to the model equation, and calculates the normal lines based on the model equation obtained upon fitting. Upon completion of step ST52, processing proceeds to step ST54.

In step ST54, the UI processing section 42 generates the teacher data. The UI processing section 42 generates the teacher data in accordance with the normal lines calculated based on the polarized images of the learning object. Upon completion of step ST54, processing proceeds to step ST55.

In step ST55, the UI processing section 42 stores the teacher data. The UI processing section 42 causes the teacher database section 422 to store the teacher data generated in step ST54.

Further, steps ST51 to ST55 are performed for each learning object so as to let the UI processing section 42 store teacher data that is generated with various objects regarded as learning objects. When the UI information is to be generated based on the polarized images and the normal lines having uncertainty, the UI processing section 42 performs step ST53 to generate non-polarized images from the polarized images. Further, in step ST54, the UI processing section 42 generates teacher data by using the normal lines calculated based on the polarized images of the learning objects and the feature amount calculated from the non-polarized images.

FIG. 21 is a flowchart illustrating a recognition operation performed based on a learning result. In step ST61, the polarized image acquisition section 20-1 acquires polarized images of the recognition target object. The polarized image acquisition section 20-1 uses a polarizing plate or a polarizing filter to acquire a plurality of polarized images that show the recognition target object and have different polarization directions. Upon completion of step ST61, processing proceeds to step ST62.

In step ST62, the normal line calculation section 32-1 calculates the normal lines. The normal line calculation section 32-1 fits the pixel values of individual pixels in the polarized images having different polarization directions to the model equation, and calculates the normal lines based on the model equation obtained upon fitting. Upon completion of step ST62, processing proceeds to step ST64.

In step ST64, the UI processing section 42 generates the student data. The UI processing section 42 generates the student data in accordance with the normal lines calculated based on the polarized images of the recognition target object. Upon completion of step ST64, processing proceeds to step ST65.

In step ST65, the UI processing section 42 generates the UI information. In accordance with the student data generated in step ST64 and the teacher data stored upon completion of steps ST51 to ST55, the UI processing section 42 determines, for example, the type, position, and posture of the recognition target object, and regards the result of determination as the UI information. When the UI information is to be generated based on the normal lines having uncertainty and the polarized images, the UI processing section 42 performs step ST63 to generate non-polarized images from the polarized images. Further, in step ST64, the UI processing section 42 generates the student data by using the normal lines calculated based on the polarized images of the recognition target object and the feature amount calculated from the non-polarized images.

<3-3. Concrete Example of Second Embodiment>

A concrete example of the second embodiment will now be described. FIG. 22 illustrates an operation of a concrete example according to the second embodiment. The concrete example illustrates a case where the UI information is to be generated based on normal lines having uncertainty. In step S71, the polarized image acquisition section 20-2 acquires polarized images (teacher polarized images) of a learning object. The polarized image acquisition section 20-2 uses a polarizing plate or a polarizing filter to acquire a plurality of polarized images that show a hand, for example, in the shape of rock and have different polarization directions. Upon completion of step ST71, processing proceeds to step ST72.

In step ST72, the normal line calculation section 32-2 calculates the normal lines. The normal line calculation section 32-2 fits the pixel values of individual pixels in the polarized images having different polarization directions to the model equation, and calculates the normal lines that are based on the model equation obtained upon fitting and related to the hand in the shape of rock. Upon completion of step ST72, processing proceeds to step ST73.

In step ST73, the UI processing section 42 generates the teacher data. The UI processing section 42 generates the teacher data based on the normal lines of the learning object. For example, the UI processing section 42 operates so that the normal lines obtained while the hand is in the shape of rock are converted to a histogram, and regards the resulting normal line histogram as the teacher data. Upon completion of step ST73, processing proceeds to step ST74.

In step ST74, the UI processing section 42 stores the teacher data. The UI processing section 42 operates so that the normal line histogram obtained when the hand is in the shape of rock is regarded as the teacher data, and stores the teacher data in the teacher database section.

Further, steps ST71 to ST74 are performed for each learning object while the hand is, for example, in the shape of paper and in the shape of scissors, and the teacher data obtained in each state is stored in the teacher database section 422.

In step ST75, the polarized image acquisition section 20-1 acquires polarized images of the recognition target object. The polarized image acquisition section 20-1 uses a polarizing plate or a polarizing filter to acquire a plurality of polarized images that show the hand engaged, for example, in a game of Rock-Paper-Scissors and have different polarization directions. Upon completion of step ST75, processing proceeds to step ST76.

In step ST76, the normal line calculation section 32-1 calculates the normal lines. The normal line calculation section 32-1 fits the pixel values of individual pixels in the polarized images having different polarization directions to the model equation, and calculates the normal lines that are based on the model equation obtained upon fitting. Upon completion of step ST76, processing proceeds to step ST77.

In step ST77, the UI processing section 42 generates the student data. The UI processing section 42 generates the student data based on the normal lines of the recognition target object. For example, the UI processing section 42 operates so that the normal lines indicative of a state of the hand to be recognized is converted to a histogram, and regards the resulting normal line histogram as the student data. Upon completion of step ST77, processing proceeds to step ST78.

In step ST78, the UI processing section 42 generates the UI information. The UI processing section 42 checks the teacher database section 422 to determine teacher data that is closest to the student data obtained in step ST77. Further, the UI processing section 42 determines a hand state corresponding to the determined teacher data as the hand state shown by the polarized images acquired in step ST75, and outputs the result of determination as the UI information.

Performing the above-described process makes it possible to generate the UI information without performing a process of resolving the uncertainty of the normal lines. Additionally, the recognition process can be performed more accurately than when a distance image is used, as is the case with the first embodiment.

Further, the second embodiment separately provides a configuration for generating normal lines from a learning object and a configuration for generating normal lines from a recognition target object. Therefore, the configuration for generating the normal lines from the learning object is capable of generating the teacher data more accurately than the configuration for generating the normal lines from the recognition target object. Consequently, the teacher data used as a determination reference is stored in the teacher database section 422 as highly accurate data. As a result, a highly accurate determination result can be obtained. Furthermore, in the second embodiment, a polarized image acquisition section and a normal line calculation section may be commonly used for generating the normal lines from a learning object and generating the normal lines from a desired recognition target object. In such an instance, the image processing apparatus has a simplified configuration and can be offered at a low price. Moreover, the second embodiment may be configured so that the UI processing section includes, for example, a communication section and a recording medium mounting section in order to permit the teacher data to be updated, added, or otherwise modified from the outside. When the teacher data can be updated, added, or otherwise modified from the outside through a communication channel or a recording medium as mentioned above, an increased number of objects can be handled as the objects to be recognized. This provides increased versatility.

FIG. 23 illustrates a user interface to which the present technology is applicable. For example, hand recognition is performed with a hand selected as the recognition target object. When hand recognition is performed, the shape and finger pointing direction of a hand can be determined. When the shape of a hand is to be determined, a three-dimensional shape can be accurately acquired. Therefore, the shapes of fingers can be accurately acquired. Further, face recognition is performed with a face selected as the recognition target object. When face recognition is performed, it is possible to perform personal authentication and determine the facial expression and the sight line direction. Furthermore, person recognition is performed with a person selected as the recognition target object. When person recognition is performed, it is possible to perform body shape authentication and posture determination. Moreover, when object authentication is performed with an object selected as the recognition target object, the posture of a known object can be determined.

According to the present technology, normal lines calculated from polarized images are more similar to the three-dimensional shape of an object than normal lines generated from a conventional distance image. Therefore, when, for example, the object is angled relative to a camera, the normal lines can be steadily calculated. Consequently, using the normal lines calculated from the polarized images makes it possible to recognize a recognition target object easily and with high accuracy. Further, when the present technology is applied to a user interface, for example, a finger pointing direction can be recognized more certainly than when it is recognized from a distance image. As a result, a stress-free user interface can be offered. If the polarized image acquisition section is configured as illustrated, for example, in FIG. 4(a) or 4(b), the normal lines can be calculated from polarized images captured by a monocular camera. This eliminates the necessity of using a plurality of cameras. Accordingly, the present technology is easily applicable to a user interface.

A series of processes described in the specification can be performed by hardware, software, or a combination of both. When the processes are to be performed by software, it is possible to install a program, in which a processing sequence is recorded, in a memory of a computer incorporated in dedicated hardware and then execute the program, or install the program in a general-purpose computer capable of performing various processes and then execute the program.

For example, the program can be prerecorded on a hard disk or solid state drive (SSD), which are used as a recording medium, or in a read only memory (ROM). Alternatively, the program can be stored (recorded) temporarily or permanently on a flexible disk, compact disc read only memory (CD-ROM), magneto-optical (MO) disk, digital versatile disc (DVD), Blu-Ray disc (BD) (registered trademark), magnetic disk, semiconductor memory card, or other removable recording medium. Such a removable recording medium can be supplied as package software.

As an alternative to the method for installing the program on a computer from a removable recording medium, the program may be transferred from a download site to the computer in a wireless or wired manner via a network such as a local area network (LAN) or the Internet. In such an instance, the computer can receive the transferred program and install it on a built-in hard disk or other recording medium.

The advantages described in the present specification are merely illustrative and not restrictive. The present technology is not limited to the described advantages and can provide additional advantages. The interpretation of the present technology is not limited to those described in conjunction with the foregoing embodiments. The embodiments of the present technology disclose the present technology in an illustrative manner. It is to be understood that the embodiments may be modified or changed by those skilled in the art without departing from the spirit and scope of the present technology. That is to say, the spirit of the present technology should be determined in consideration of the appended claims.

Further, the image processing apparatus of the present technology may adopt the following configurations.

(1) An image processing apparatus including:
a polarized image acquisition section that acquires a plurality of polarized images that have different polarization directions and show the image of a recognition target object;
a normal line calculation section that calculates normal lines for individual pixels in accordance with the polarized images acquired by the polarized image acquisition section; and a recognition section that recognizes the object by using the normal lines calculated by the normal line calculation section.

(2) The image processing apparatus as described in (1) above, in which the recognition target object is an input indicator for a user interface, and the recognition section regards a result of recognition of the object as input information on the user interface.

(3) The image processing apparatus as described in (1) or (2) above, in which the normal line calculation section includes a temporary recognition process image generation section that generates a temporary recognition process image from the plurality of polarized images,
a temporary recognition processing section that temporarily recognizes the object by using the temporary recognition process image generated by the temporary recognition process image generation section,
a polarization processing section that calculates normal lines from the plurality of polarized images, and
an uncertainty resolution section that resolves uncertainty of the normal lines calculated by the polarization processing section in accordance with a result of temporary recognition by the temporary recognition processing section, and
the recognition section recognizes the object by using the normal lines freed from uncertainty by the normal line calculation section.

(4) The image processing apparatus as described in (3) above, in which the temporary recognition processing section uses the temporary recognition process image and images of pre-registered models to select a model closest to the object as the result of temporary recognition of the object, and the uncertainty resolution section resolves the uncertainty of the normal lines calculated by the polarization processing section in accordance with the model temporarily recognized by the temporary recognition processing section.

(5) The image processing apparatus as described in (4) above, in which the recognition target object is a hand, the temporary recognition processing section recognizes positions of a fingertip and finger pulp of the hand by using the temporary recognition process image and the images of pre-registered models, and the uncertainty resolution section resolves the uncertainty of normal lines of a finger region of the hand in accordance with the positions of the fingertip and finger pulp temporarily recognized by the temporary recognition processing section.

(6) The image processing apparatus as described in (5) above, in which the recognition section determines a finger pointing direction in accordance with the normal lines of the finger region that are freed from uncertainty by the normal line calculation section.

(7) The image processing apparatus as described in (4) above, in which the recognition target object is a face, the temporary recognition processing section recognizes a position of a face region by using the temporary recognition process image and the images of pre-registered models, and the uncertainty resolution section resolves the uncertainty of normal lines of the face in accordance with the position of the face region temporarily recognized by the temporary recognition processing section.

(8) The image processing apparatus as described in (7) above, in which the recognition section determines a shape or expression of a face in accordance with the normal lines of the face region that are freed from uncertainty by the normal line calculation section.

(9) The image processing apparatus as described in (4) above, in which the recognition target object is a hand, the temporary recognition processing section recognizes a position and skeletal structure of a hand region by using the temporary recognition process image and the images of pre-registered models, and the uncertainty resolution section resolves the uncertainty of normal lines of the hand region in accordance with the position and skeletal structure of the hand region temporarily recognized by the temporary recognition processing section.

(10) The image processing apparatus as described in (9) above, in which the recognition section determines a shape of a hand in accordance with the normal lines of the hand region that are freed from uncertainty by the normal line calculation section.

(11) The image processing apparatus as described in (1) or (2) above, in which the recognition section includes
a teacher data generation section that generates teacher data based on a learning object from normal lines calculated in accordance with a plurality of polarized images that show the learning object and have different polarization directions,
a teacher database section that stores the teacher data generated for each learning object by the teacher data generation section, and
a recognition processing section that recognizes the recognition target object in accordance with student data and teacher data, the student data being generated based on the recognition target object by using the normal lines calculated from a plurality of polarized images that show the recognition target object and have different polarization directions, the teacher data being stored in the teacher database section.

(12) The image processing apparatus as described in (11) above, in which the polarized image acquisition section acquires a plurality of polarized images having the different polarization directions for each recognition target object and each learning object, and the normal line calculation section calculates normal lines for each recognition target object and each learning object in accordance with the polarized images acquired by the polarized image acquisition section.

(13) The image processing apparatus as described in (11) or (12) above, further including:
a learning polarized image acquisition section that acquires a plurality of polarized images that show the learning object and have different polarization directions; and
a learning normal line calculation section that calculates normal lines in accordance with the polarized images acquired by the learning polarized image acquisition section.

(14) The image processing apparatus as described in any one of (11) to (13) above, in which the teacher data is indicative of distribution of normal lines concerning the learning object, and the student data is indicative of distribution of normal lines calculated for the recognition target object.

(15) The image processing apparatus as described in any one of (11) to (14) above, in which the recognition processing section selects a learning object corresponding to teacher data closest to the student data as a result of recognition.

INDUSTRIAL APPLICABILITY

The image processing apparatus, the image processing method, and the program according to the present technology are configured so as to acquire a plurality of polarized images that show a recognition target object and have different polarization directions, calculate normal lines for individual pixels in accordance with the acquired polarized images, and recognize the object by using the calculated normal lines. Therefore, objects can be recognized easily and with high accuracy. Consequently, the image processing apparatus, the image processing method, and the program according to the present technology are suitable for instruments having an interface that, for example, provides operational control or start, end, change, or edit a signal process in accordance with the results of recognition, for instance, of the type, position, and posture of an object.

REFERENCE SIGNS LIST

10, 11, 12 . . . Image processing apparatus
20, 20-1, 20-2 . . . Polarized image acquisition section
30, 31, 32-1, 32-2 . . . Normal line calculation section
40 . . . Recognition section
41, 42 . . . User interface (UI) processing section
201 . . . Image sensor
202 . . . Polarizing filter
203 . . . Lens
204, 211, 212-1 to 212-4 . . . Polarizing plate
210, 210-1 to 210-4 . . . Imaging section
301 . . . Polarization processing section
302 . . . Temporary recognition process image generation section
303 . . . Temporary recognition processing section
304 . . . Model database section
305 . . . Uncertainty resolution section
421 . . . Teacher data generation section
422 . . . Teacher database section
423 . . . Recognition processing section

The invention claimed is:
1. An image processing apparatus, comprising:
a storage device configured to store a plurality of images of a plurality of objects; and
circuitry configured to:
acquire a first plurality of polarized images of a recognition target object,
wherein a first polarized image of the first plurality of polarized images has a first polarization direction different from a second polarization direction of a second polarized image of the first plurality of polarized images;
calculate first normal lines of the recognition target object for each of a plurality of pixels in the first plurality of polarized images;
select a stored image of an object of the plurality of objects based on at least one feature of the recogni- tion target object, wherein the plurality of images includes the stored image;

resolve, based on the selected stored image, an uncertainty of the calculated first normal lines of the recognition target object to generate uncertainty-free first normal lines; and recognize the recognition target object based on the uncertainty-free first normal lines of the recognition target object.

2. The image processing apparatus according to claim 1, wherein the recognition target object is an input indicator for a user interface, and the circuitry is further configured to output a result of the recognition of the recognition target object as input information on the user interface.

3. The image processing apparatus according to claim 1, wherein the circuitry is further configured to:

generate a temporary recognition process image from the first plurality of polarized images;

recognize the at least one feature of the recognition target object based on the temporary recognition process image; and resolve the uncertainty further based on a result of the recognition of the at least one feature of the recognition target object.

4. The image processing apparatus according to claim 3, wherein the circuitry is further configured to select the stored image of the object, based on the object being closest to the recognition target object among the plurality of objects, as the result of the recognition of the at least one feature of the recognition target object.

5. The image processing apparatus according to claim 4, wherein the recognition target object is a hand, and the circuitry is further configured to:

recognize each of a position of a fingertip of the hand and a position of a finger pulp of the hand based on the temporary recognition process image and the stored plurality of images; and resolve an uncertainty of second normal lines of a finger region of the hand to generate uncertainty-free second normal lines, wherein the uncertainty of the second normal lines is resolved based on the recognized position of the fingertip and the recognized position of the finger pulp.

6. The image processing apparatus according to claim 5, wherein the circuitry is further configured to determine a finger pointing direction based on the generated uncertainty-free second normal lines of the finger region.

7. The image processing apparatus according to claim 4, wherein the recognition target object is a face, and the circuitry is further configured to:

recognize a position of a face region based on the temporary recognition process image and the stored plurality of images; and resolve an uncertainty of second normal lines of the face to generate uncertainty-free second normal lines, wherein the uncertainty of the second normal lines is resolved based on the recognized position of the face region.

8. The image processing apparatus according to claim 7, wherein the circuitry is further configured to determine at least one of a shape of the face or an expression of the face based on the generated uncertainty-free second normal lines of the face region.

9. The image processing apparatus according to claim 4, wherein the recognition target object is a hand, and the circuitry is further configured to:

recognize each of a position of a hand region and a skeletal structure of the hand region based on the temporary recognition process image and the stored plurality of images; and resolve an uncertainty of second normal lines of the hand region to generate uncertainty-free second normal lines, wherein the uncertainty of the second normal lines is resolved based on the recognized position of the hand region and the skeletal structure of the hand region.

10. The image processing apparatus according to claim 9, wherein the circuitry is further configured to determine a shape of the hand based on the generated uncertainty-free second normal lines of the hand region.

11. The image processing apparatus according to claim 1, wherein the circuitry is further configured to:

calculate second normal lines based on a second plurality of polarized images of a learning object;

generate teacher data based on the second normal lines of the learning object, wherein a third polarized image of the second plurality of polarized images has a third polarization direction different from a fourth polarization direction of a fourth polarized image of the second plurality of polarized images;

control the storage device to store the generated teacher data; and recognize the recognition target object based on student data and the stored teacher data, wherein the student data is generated based on the calculated first normal lines.

12. The image processing apparatus according to claim 11, wherein the circuitry is further configured to calculate the second normal lines of the learning object for each of the second plurality of polarized images.

13. The image processing apparatus according to claim 11, wherein the teacher data is an indication of distribution of the second normal lines of the learning object, and the student data is an indication of distribution of the calculated first normal lines of the recognition target object.

14. The image processing apparatus according to claim 11, wherein the circuitry is further configured to select the learning object corresponding to the teacher data, based on the student data, as a result of the recognition of the recognition target object.

15. An image processing method, comprising:

in an image processing apparatus:

acquiring a plurality of polarized images of a recognition target object, wherein a first polarized image of the plurality of polarized images has a first polarization direction different from a second polarization direction of a second polarized image of the plurality of polarized images;

calculating normal lines of the recognition target object for each of a plurality of pixels in the plurality of polarized images;

selecting an image of an object of a plurality of objects based on at least one feature of the recognition target object, wherein the image is stored in a storage device;

resolving, based on the selected image, an uncertainty of the normal lines of the recognition target object to generate uncertainty-free normal lines; and recognizing the recognition target object based on the uncertainty-free normal lines of the recognition target object.

16. A non-transitory computer-readable medium having stored thereon, computer-executable instructions, which when executed by a computer, cause the computer to execute operations, the operations comprising:

acquiring a plurality of polarized images of a recognition target object,
wherein a first polarized image of the plurality of polarized images has a first polarization direction different from a second polarization direction of a second polarized image of the plurality of polarized images;

calculating normal lines of the recognition target object for each of a plurality of pixels in the plurality of polarized images;

selecting an image of an object of a plurality of objects, stored in a storage device, based on at least one feature of the recognition target object;

resolving, based on the selected image, an uncertainty of the normal lines of the recognition target object to generate uncertainty-free normal lines; and recognizing the recognition target object based on the uncertainty-free normal lines of the recognition target object.

17. An image processing apparatus, comprising:

circuitry configured to:

acquire a plurality of polarized images of a recognition target object,
wherein a first polarized image of the plurality of polarized images has a first polarization direction that is different from a second polarization direction of a second polarized image of the plurality of polarized images;

calculate normal lines of the recognition target object for each of a plurality of pixels in the plurality of polarized images;

generate a temporary recognition process image from the plurality of polarized images;

recognize at least one feature of the recognition target object based on the temporary recognition process image;

resolve an uncertainty of the normal lines, based on the recognized at least one feature of the recognition target object, to generate uncertainty-free normal lines; and recognize the recognition target object based on the uncertainty-free normal lines.

* * * * *